US012182212B2

(12) United States Patent
Liu et al.

(10) Patent No.: US 12,182,212 B2
(45) Date of Patent: Dec. 31, 2024

(54) METHOD, APPARATUS, ELECTRONIC DEVICE, AND STORAGE MEDIUM FOR WEB SEARCH

(71) Applicant: Tsinghua University, Beijing (CN)

(72) Inventors: Yiqun Liu, Beijing (CN); Xuesong Chen, Beijing (CN); Xiaohui Xie, Beijing (CN); Ziyi Ye, Beijing (CN); Shuqi Zhu, Beijing (CN); Weihang Su, Beijing (CN); Xiaorong Gao, Beijing (CN); Yike Sun, Beijing (CN); Min Zhang, Beijing (CN); Shaoping Ma, Beijing (CN)

(73) Assignee: Tsinghua University, Beijing (CN)

( * ) Notice: Subject to any disclaimer, the term of this patent is extended or adjusted under 35 U.S.C. 154(b) by 127 days.

(21) Appl. No.: 17/982,219

(22) Filed: Nov. 7, 2022

(65) Prior Publication Data
US 2023/0169130 A1  Jun. 1, 2023

(30) Foreign Application Priority Data
Nov. 26, 2021 (CN) .......................... 202111423899.4

(51) Int. Cl.
*G06F 16/9532* (2019.01)
*G06F 3/01* (2006.01)
*G06F 16/9538* (2019.01)

(52) U.S. Cl.
CPC .......... *G06F 16/9532* (2019.01); *G06F 3/013* (2013.01); *G06F 3/015* (2013.01); *G06F 16/9538* (2019.01); *G06F 2203/011* (2013.01)

(58) Field of Classification Search
CPC ............. G06F 16/9532; G06F 16/9538; G06F 16/013; G06F 16/015; G06F 2203/011; G06F 3/013; G06F 3/015
See application file for complete search history.

(56) References Cited

U.S. PATENT DOCUMENTS

| 9,304,586 B2 * | 4/2016 | Nister ..................... G06F 3/013 |
| 10,860,100 B2 * | 12/2020 | Osterhout ............. G06F 3/0346 |
| 11,016,567 B1 * | 5/2021 | Nour ........................ G06F 3/015 |
| 11,567,574 B2 * | 1/2023 | Krishna .............. G06F 16/9032 |

(Continued)

FOREIGN PATENT DOCUMENTS

| CN | 101055587 A | 10/2007 |
| CN | 102521251 A | 6/2012 |

(Continued)

*Primary Examiner* — Tadesse Hailu
(74) *Attorney, Agent, or Firm* — WOMBLE BOND DICKINSON (US) LLP

(57) ABSTRACT

The present disclosure relates to a method and an apparatus, an electronic device and a storage medium for web search. The method includes: acquiring a steady-state visual evoked potential in EEG information, where the steady-state visual evoked potential is generated when a user gazes at a key on a query inputting keyboard in a visual spelling page; sending the steady-state visual evoked potential to a server, such that the server, based on the steady-state visual evoked potential, determines a character string inputted by the user, and a landing page corresponding to the character string; and in response to receiving the landing page sent by the server, displaying the landing page.

19 Claims, 8 Drawing Sheets

(56) References Cited

U.S. PATENT DOCUMENTS

| | | | |
|---|---|---|---|
| 11,640,204 B2* | 5/2023 | Shenoy | G06F 3/015 |
| | | | 345/156 |
| 11,907,421 B1* | 2/2024 | Clements | G06F 3/012 |
| 2007/0164990 A1* | 7/2007 | Bjorklund | G06F 3/017 |
| | | | 345/156 |
| 2011/0159467 A1* | 6/2011 | Peot | G09B 7/06 |
| | | | 434/157 |
| 2012/0191542 A1* | 7/2012 | Nurmi | G06Q 30/0256 |
| | | | 705/14.54 |
| 2016/0187654 A1* | 6/2016 | Border | G02B 27/0172 |
| | | | 359/630 |
| 2016/0259977 A1* | 9/2016 | Asbun | H04W 4/30 |
| 2016/0267200 A1* | 9/2016 | Guo | G06F 16/3322 |
| 2017/0083524 A1* | 3/2017 | Huang | G06F 16/9538 |
| 2017/0115742 A1* | 4/2017 | Xing | G06F 3/0485 |
| 2017/0185150 A1* | 6/2017 | Yang | G06F 3/04842 |
| 2017/0371522 A1* | 12/2017 | Martinez Del Corral | |
| | | | G06F 3/04883 |
| 2020/0159323 A1* | 5/2020 | Gand | G06F 3/04842 |
| 2020/0337653 A1* | 10/2020 | Alcaide | A61B 5/369 |
| 2020/0364539 A1* | 11/2020 | Anisimov | G06F 3/011 |
| 2021/0065237 A1* | 3/2021 | Øhrn | G06F 16/9566 |
| 2021/0107162 A1* | 4/2021 | Kim | G06F 3/0482 |
| 2022/0280096 A1* | 9/2022 | Song | A61B 5/378 |

FOREIGN PATENT DOCUMENTS

| | | |
|---|---|---|
| CN | 101968715 B | 10/2012 |
| CN | 103543836 A | 1/2014 |
| CN | 113110743 A | 7/2021 |
| WO | 2015178558 A1 | 11/2015 |

* cited by examiner

METHOD, APPARATUS, ELECTRONIC DEVICE, AND STORAGE MEDIUM FOR WEB SEARCH

CROSS-REFERENCE TO RELATED APPLICATIONS

The present application is based upon and claims the benefit of a priority of Chinese Patent Application No. 202111423899.4, filed on Nov. 26, 2021, the entire contents of which are incorporated herein by reference.

TECHNICAL FIELD

The present disclosure relates to the technical field of computers, and in particular, to a method, an apparatus, an electronic device and a storage medium for web search.

BACKGROUND

With the increasingly wide application of the Internet, search engines are becoming a channel for many people to seek information, changing the way people live and think. In the related art, from the perspective of users, a search engine may provide a page containing a search box, into which users may enter a query term according to their search intent, which will then be submitted to the search engine through a browser. After that, the search engine will return an information list of search results related to the entered query term, among which users may click to satisfy their information needs.

Driven by the diversified information needs and big data technology, the search technology is developing and improving continuously. However, in order to better improve the search experience, the following aspects of the search technology are to be addressed.

Firstly, in a typical search in the related art, a user summarizes the information needs into a query term and submits it to the search engine. Usually, the query term constructed by the user may hardly convey the actual information needs of the user accurately since it may be ambiguous or broad. However, the search engine may highly rely on this query term to retrieve and rank relevant documents, bringing uncertainty and ambiguity to the search results, which further hinders the improvement of search performance.

Secondly, although the search engine in the related art may collect implicit feedbacks of users such as clicks, dwell time and the like, such implicit feedbacks may not objectively reflect actual feelings of the users, and may also bring more noise, resulting in negative interference on the ranking of the search results.

Thirdly, interaction theories and methods of search engines in the related art are designed and constructed based on a mouse and a keyboard, which is not suitable for some special scenarios and users.

SUMMARY

The present disclosure provides a web search technical solution.

According to an aspect of the present disclosure, a web search method applied to a user terminal includes: displaying a visual spelling page having a query keyboard; acquiring a steady-state visual evoked potential from electroencephalogram (EEG) information, where the steady-state visual evoked potential is generated when a user gazes at a key on the query keyboard; sending the steady-state visual evoked potential to a server; and in response to receiving the landing page sent by the server, displaying the landing page. For example, on the server side, in response to the steady-state visual evoked potential, the server, based on the steady-state visual evoked potential, determines a character string inputted by the user and a the landing page corresponding to the character string.

In a possible implementation, after displaying the landing page, the method further includes: acquiring EEG information generated when the user gazes at the landing page; sending the EEG information to the server, such that the server detects the user's feedback information in response to the landing page based on the EEG information, and determines a search engine result page based on the feedback information, where the feedback information includes emotion information determined based on the EEG information, and the search engine result page includes at least two search results corresponding to the character string; and in response to receiving the search engine result page sent by the server, displaying the search engine result page.

In a possible implementation, the visual spelling page further includes a query suggestion module, and the sending the steady-state visual evoked potential to a server, such that the server determines, based on the steady-state visual evoked potential, a character string inputted by the user and a landing page corresponding to the character string includes: sending the steady-state visual evoked potential to the server, such that the server, based on the steady-state visual evoked potential, determines the character string inputted by the user and at least one query term corresponding to the string; in response to receiving the character string and the at least one query term sent by the server, displaying the character string and the at least one query term through the query suggestion module; acquiring a search context in the EEG information, where the search context includes user state information; and sending the search context to the server, such that the server determines the landing page based on the at least one query term and the search context.

In a possible implementation, the method further includes: acquiring eye movement information, and the sending the steady-state visual evoked potential to a server, such that the server determines, based on the steady-state visual evoked potential, a character string inputted by the user and a landing page corresponding to the string, includes: sending the steady-state visual evoked potential and the eye movement information to the server, such that the server determines the string inputted by the user based on the steady-state visual evoked potential and the eye movement information.

In a possible implementation, the method further includes: in a case where the eye movement information and/or the EEG information indicates paying attention to a preset area in the landing page, displaying a landing keyboard in the landing page, where the landing keyboard includes at least one key position, and each key position corresponds to a different operation; and determining a selected key position based on the eye movement information and/or the EEG information, and executing an operation corresponding to the key position.

In a possible implementation, the method further includes: in a case where the eye movement information and/or the EEG information indicates paying attention to a preset area in the search engine result page, displaying at least one search engine result keyboard, where each search engine result keyboard includes at least one key position, and each key position corresponds to a different operation;

and determining a selected key position based on the eye movement information and/or the EEG information, and executing an operation corresponding to the key position.

According to an aspect of the present disclosure, an method for web search, applied to a server, includes: receiving a steady-state visual evoked potential sent by a user terminal, where the steady-state visual evoked potential is generated when a user gazes at keys on a query keyboard of the user terminal; based on the steady-state visual evoked potential, determining a character string inputted by the user and a landing page corresponding to the character string; and sending the landing page to the user interface, such that the user terminal displays the landing page.

In a possible implementation, the method further includes: receiving EEG information sent by the user terminal, where the EEG information is generated when the user gazes at the landing page of the user terminal; based on the EEG information, detecting the user's feedback information in response to the landing page, where the feedback information includes emotion information determined based on the EEG information; determining a search engine result page based on the feedback information, where the search engine result page includes at least two search results corresponding to the character string; and sending the search engine result page to the user terminal, such that the user terminal displays the search engine result page.

In a possible implementation, the based on the steady-state visual evoked potential, determining a character string inputted by the user and a landing page corresponding to the character string, includes: based on the steady-state visual evoked potential, determining the character string inputted by the user and at least one query term corresponding to the character string; sending to the user terminal the character string and the at least one query term corresponding to the character string, such that the user terminal displays the character string and the at least one query term in the query suggestion module of the visual spelling page; receiving a search context sent by the user terminal, where the search context includes user state information; and determining the landing page based on the at least one query term and the search context.

In a possible implementation, the determining a search engine result page based on the feedback information includes: determining a difference between a subject of each search result and a subject of each of the landing page; and in a case where the feedback information is dissatisfaction, ranking the search results with a larger difference higher than the search results with a smaller difference, or in a case where the feedback information is satisfaction, ranking the search results with a larger difference lower than the search results with a smaller difference.

In a possible implementation, the method further includes: receiving EEG information sent by the user terminal, where the EEG information is generated when the user views the search engine result page displayed by the user terminal; detecting the user's preference information about search results in the search engine result page in real time based on the acquired EEG information; re-ranking the search results in the search engine result page in real time based on the preference information; and sending the re-ranked search engine result page to the user terminal, such that the user terminal displays the re-ranked search engine result page in real time.

In a possible implementation, the based on the steady-state visual evoked potential, determining a character string inputted by the user and a query term corresponding to the character string includes: determining the character string inputted by the user based on the steady-state visual evoked potential; and determining at least one query term corresponding to the character string by means of a candidate word generation algorithm with massive information on the Internet.

In a possible implementation, the method further includes: receiving eye movement information sent by the user terminal, and the based on the steady-state visual evoked potential, determining a character string inputted by the user, includes: determining the character string inputted by the user based on the steady-state visual evoked potential and the eye movement information.

In a possible implementation, the detecting the user's feedback information in response to the landing page based on the EEG information includes: inputting the EEG information to a satisfaction predicting model to determine a degree of user satisfaction; determining a corresponding relationship between the degree of user satisfaction and each text content in the landing page based on the eye movement information and/or the EEG information; and determining the feedback information according to the degree of user satisfaction corresponding to each text content in the landing page.

According to an aspect of the present disclosure, an apparatus for web search, applied to a user terminal, includes: a first displaying module configured to display a visual spelling page, where the visual spelling page includes a query keyboard; a first acquiring module configured to acquire a steady-state visual evoked potential, where the steady-state visual evoked potential is generated when a user gazes at keys on the query keyboard; a first sending module configured to send the steady-state visual evoked potential to a server, such that the server, based on the steady-state visual evoked potential, determines a character string inputted by the user, and a landing page corresponding to the character string; and a second displaying module configured to display the landing page in response to receiving the landing page sent by the server.

In a possible implementation, the apparatus further includes: a second acquiring module configured to, after the landing page is displayed, acquire EEG information, where the EEG information is generated when the user gazes at the landing page; a second sending module configured to send the EEG information to the server, such that the server detects the user's feedback information in response to the landing page based on the EEG information, and determines a search engine result page according to the feedback information, where the feedback information includes emotion information determined based on the EEG information, and the search engine result page includes at least two search results corresponding to the character string; and a third displaying module configured to display the search engine result page in response to receiving the search engine result page sent by the server.

In a possible implementation, the visual spelling page also includes a query suggestion module, and the first sending module is configured to: send the steady-state visual evoked potential to the server, such that the server, based on the steady-state visual evoked potential, determines the character string inputted by the user and at least one query term corresponding to the character string; in response to receiving the character string and the at least one query term sent by the server, display the character string and the at least one query term through the query suggestion module; acquire a search context in the EEG information, where the search context includes user state information; and send the search context to the server, such that the server determines the landing page based on the at least one query term and the search context.

In a possible implementation, the apparatus is further configured to: acquire eye movement information, and the first sending module is configured to: send the steady-state visual evoked potential and the eye movement information to the server, such that the server determines the character string inputted by the user based on the steady-state visual evoked potential and the eye movement information.

In a possible implementation, the apparatus is further configured to: in a case where the eye movement information and/or the EEG information indicates paying attention to a preset area in the landing page, display a landing keyboard in the landing page, where the landing keyboard includes at least one key position, and each key position corresponds to a different operation; and determine a selected key position based on the eye movement information and/or the EEG information, and execute an operation corresponding to the key position.

In a possible implementation, the apparatus is further configured to: in a case where the eye movement information and/or the EEG information indicates paying attention to a preset area in the search engine result page, display at least one search engine result keyboard, where each search engine result keyboard includes at least one key position, and each key position corresponds to a different operation; and determine a selected key position according to the eye movement information and/or the EEG information, and execute an operation corresponding to the key position.

According to an aspect of the present disclosure, an apparatus for web search, applied to a server, includes: a first receiving module configured to receive a steady-state visual evoked potential sent by a user terminal, where the steady-state visual evoked potential is generated when a user gazes at keys on a query keyboard of the user terminal; a first determining module configured to, based on the steady-state visual evoked potential, determine a character string inputted by the user and a landing page corresponding to the character string; and a third sending module configured to send the landing page to the user terminal, such that the user terminal displays the landing page.

In a possible implementation, the apparatus further includes: a second receiving module configured to receive EEG information sent by the user terminal, where the EEG information is generated when the user gazes at the landing page of the user terminal; a detecting module configured to detect the user's feedback information in response to the landing page based on the EEG information, where the feedback information includes emotion information determined based on the EEG information; a second determining module configured to determine a search engine result page based on the feedback information, where the search engine result page includes at least two search results corresponding to the character string; and a fourth sending module configured to send the search engine result page to the user terminal, such that the user terminal displays the search engine result page.

In a possible implementation, the first determining module is configured to: based on the steady-state visual evoked potential, determine the character string inputted by the user and at least one query term corresponding to the character string; send the character string and the at least one query term corresponding to the character string to the user terminal, such that the user terminal displays the character string and the at least one query term in a query suggestion module of a visual spelling page; receive a search context sent by the user terminal, where the search context includes user state information; and determine the landing page based on the at least one query term and the search context. The landing page may be determined based on the search context received from the user terminal (e.g., GPS position information of the user), along with the search context derived from the EEG information by the server (e.g., the mood of the user).

In a possible implementation, the second determining module is configured to: determine a difference between a subject of each search result and a subject of each of the landing page; in a case where the feedback information is dissatisfaction, rank the search results with a larger difference higher than the search result with a smaller difference, or in a case where the feedback information is satisfaction, rank the search results with a larger difference lower than the search result with a smaller difference.

In a possible implementation, the apparatus is further configured to: receive EEG information sent by the user terminal, where the EEG information is generated when the user views the search engine result page displayed by the user terminal; detect the user's preference information about the search results in the search engine result page in real time based on the acquired EEG information; re-rank the search results in the search engine result page in real time based on the preference information; and send the re-ranked search engine result page to the user terminal, such that the user terminal displays the re-ranked search engine result page in real time.

In a possible implementation, the based on the steady-state visual evoked potential, determining a character string inputted by the user and the at least one query term corresponding to the character string includes: determining the character string inputted by the user based on the steady-state visual evoked potential; and determining at least one query term corresponding to the character string by means of a candidate word generation algorithm with massive information on the Internet.

In a possible implementation, the apparatus is further configured to: receive eye movement information sent by the user terminal, and the first determining module is configured to: determine the character string inputted by the user based on the steady-state visual evoked potential and the eye movement information.

In a possible implementation, the detecting module is configured to: input the EEG information to a satisfaction predicting model to determine a degree of user satisfaction; determine a corresponding relationship between the degree of user satisfaction and each text content in the landing page based on the eye movement information and/or the EEG information; and determine feedback information according to the degree of user satisfaction corresponding to each text content in the landing page.

According to an aspect of the present disclosure, an electronic device includes a processor and a memory configured to store processor-executable instructions, where the processor is configured to call the instructions stored in the memory to execute the above method.

According to an aspect of the present disclosure, there is provided a computer-readable storage medium having computer program instructions stored thereon, where the computer program instructions, when executed by a processor, implement the above method.

In embodiments of the present disclosure, web search and browsing are possible without hand-based operations. In addition, in the related art, the search engine result page containing a plurality of search results is directly displayed after the query term is inputted, and the user needs to browse the search engine result page repeatedly, select and click each search result that may meet the information needs, to get the page meeting the information needs. In contrast, according to the embodiments of the present disclosure, the landing page that is most likely to meet the user's information needs is directly displayed after the character string is inputted, which helps to meet the user's information needs more efficiently and effectively by using as few pages as possible.

Furthermore, it helps to detect the user's feedback in response to the search in real time when displaying the search engine result page subsequently, so as to adjust the search results dynamically, thereby reducing complexity in user interactive operations during web search, and improving the search experience.

It should be understood that the above general descriptions and the following detailed descriptions are only exemplary and illustrative, and do not limit the present disclosure. Other features and aspects of the present disclosure may become apparent from the following detailed descriptions of exemplary embodiments with reference to the accompanying drawings.

BRIEF DESCRIPTION OF THE DRAWINGS

The drawings described here that are incorporated herein and constitute a part thereof are intended to illustrate embodiments in conformity with the present disclosure and explain the technical solutions of the present disclosure together with the specification.

DETAILED DESCRIPTION

Figure 1:
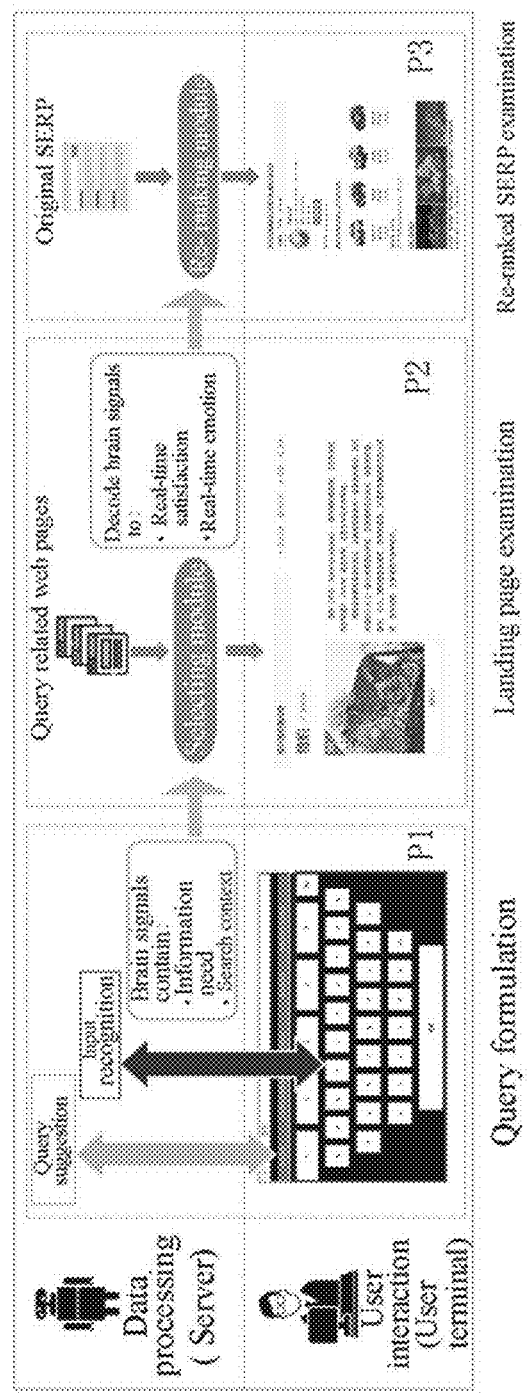
FIG. 1 illustrates an architecture schematic diagram of a web search method according to an embodiment of the present disclosure.

Various exemplary embodiments, features and aspects of the present disclosure are described in detail below with reference to the accompanying drawings. Same reference numerals in the drawings refer to elements with same or similar functions. Although various aspects of the embodiments are illustrated in the drawings, the drawings are unnecessary to draw to scale unless otherwise specified.

As used herein, the term "exemplary" is intended to be "used as an example and an embodiment or illustrative". Any embodiment described herein as "exemplary" should not be construed as being superior or better than other embodiments.

As used herein, the term "and/or" is only an association relationship describing the associated objects, indicating three relationships. For example, "A and/or B" may include three situations: A exists alone; both A and B exist; and B exists alone. Furthermore, as used herein, the term "at least one of" means any one of a plurality of or any combinations of at least two of a plurality of, for example, "including at least one of A, B and C" may represent including any one or more elements selected from a set consisting of A, B and C.

Furthermore, for better describing the present disclosure, numerous specific details are illustrated in the following detailed description. Those skilled in the art should understand that the present disclosure may be implemented without certain specific details. In some examples, methods, means, elements and circuits that are well known to those skilled in the art are not described in detail in order to highlight the subject matter of the present disclosure.

FIG. 1 illustrates a schematic diagram of a web search method according to an embodiment of the present disclosure. As shown in FIG. 1, a search system in an embodiment of the present disclosure may include a user interaction module with a user terminal as the execution body, and a data processing module with a server as the execution body. The user terminal may include a user interface.

The user interaction module running on the user interface may be configured to display a controlled key position and a search engine result, and send the collected information inputted by the user to the server. Corresponding functional pages may include a visual spelling page P1, a landing page P2, and a search engine result page P3. The data processing module running on the server may receive and parse the information inputted by the user sent by the user interface in real time, obtain user instructions or user feedback, and communicate with the user interaction module running on the user interface.

From the perspective of interaction between the user and the search system (including the user interaction module and the data processing module), the web search method shown in FIG. 1 may include three interactive behaviors: constructing a search query, examining a landing page, and examining re-ranked search engine results.

In an interaction process of constructing a search query, examining a landing page, and examining re-ranked search engine results, the user's input information is information inputted without hand-based operations, which may include electroencephalogram (EEG) information and/or eye movement information. The EEG information, including brain electric activity or wave, may be collected through a Brain Computer Interface (BCI) of the user interface, and the eye movement information may be collected by an eye movement meter of the user interface. The embodiments of the present disclosure may implement the interaction between the user and the search system based on the EEG information or the eye movement information, and may also implement the interaction between the user and the search system by combining the EEG information and the eye movement information, which is not limited herein.

For convenience of explanation, as an example, FIG. 1 briefly introduces the three interactions: constructing a query, checking a landing page, and checking re-ranked search engine results, where the information inputted by the user that is collected by the search system is the EEG information.

As shown in FIG. 1, when constructing a query, the user may summarize information needs into a character string and input the character string. For example, when the user wants to search for feline cheetah ("liebao" in phonetic Chinese), the user may summarize this information needs into a character string "liebao" or "lb", and the like. Based on a query inputting keyboard of the visual spelling page P1, the user may input the character string to the search system. When identifying the input, the search system may determine the character string inputted by the user without hand-based operations based on a steady-state visual evoked potential in the EEG information. The search system may directly search the character string inputted by the user. Alternatively, after the character string is obtained, a query suggestion module of the search system may provide search recommendation according to the character string inputted by the user in combination with massive data of the Internet, to help the user to perform query input quickly.

The EEG information generated may contain information needs and a search context (such as user state, knowledge level, time, and position), which is a user-side feature that cannot be captured by a search engine based on the hand-based operation in the related art, and may be used to determine the landing page P2 in a subsequent process of examining the landing page.

As shown in FIG. 1, when examining the landing page, a selection module of the server of the search system may retrieve on the Internet according to the EEG information obtained in the process of constructing a search query, and then select an optimal page (or lucky page) from pages related to the query as the landing page P2. For example, given that the character string inputted in the process of constructing a search is "liebao", the web pages related to the search may include pages introducing feline cheetah ("liebao" in phonetic Chinese), pages of Cheetah (corresponding to "liebao" in phonetic Chinese) Browser, and pages related to Cheetah (corresponding to "liebao" in phonetic Chinese) Motors. In this case, assuming that it is analyzed from the search context included in the EEG information that the user is in a working state, the pages of Cheetah Browser may be determined as the landing page P2 from the pages related to the query. The selecting module may use a trained selecting model to select the pages related to the query, or may use a non-training method to perform the selection. A specific algorithm for the selecting module is not limited herein.

After the search system determines the landing page P2, the landing page P2 will be displayed in the user interface. When browsing the landing page P2, the user may be satisfied and feel happy when browsing the helpful information; and the user may be dissatisfied and feel annoyed when browsing the useless information. When the user browses the landing page, the search system may collect the EEG information of the user in real time and decode the EEG information so as to acquire the satisfaction of the user and the emotion of the user in real time.

As shown in FIG. 1, when checking re-ranked search engine results, a re-ranking module of the search system may adjust a sequence of respective search results in the original search engine results according to the user satisfaction and user situations obtained when checking the landing page, and display a search engine result page P3. The re-ranking module may use the trained selecting model to re-rank the search results, and may also use the non-training method to perform the re-ranking. A specific algorithm of the re-ranking module is not limited herein.

It should be understood that although FIG. 1 does not show an eye movement information, in order to improve the interaction efficiency between the user and the search system to improve the user experience, preferably, both the EEG information and the eye movement information may be used, where the EEG information is used mainly, supplemented by the eye movement information, to help the user to interact with the search system efficiently.

For example, attention of the user may be tracked in real time based on the eye movement information and EEG information. The attention of the user may correspond to content of a display interface of the user interface of the search system, such that the input speed and accuracy of characters may be improved at the visual spelling page P1 and the action intention of the user may be identified based on the EEG information aided by the correspondence at the landing page P2 and the search engine result page P3. With the correspondence of finer and more granular contents to the EEG information of the user, personalized modeling may be performed more accurately for the user to meet the information needs of the user, and improve the search experience.

FIG. 1 introduces architecture of a web search method in an embodiment of the present disclosure from the perspective of interaction between the user and the search system. The web search method in an embodiment of the present disclosure is described below from the perspective of the user interface and the server, respectively.

Figure 2:
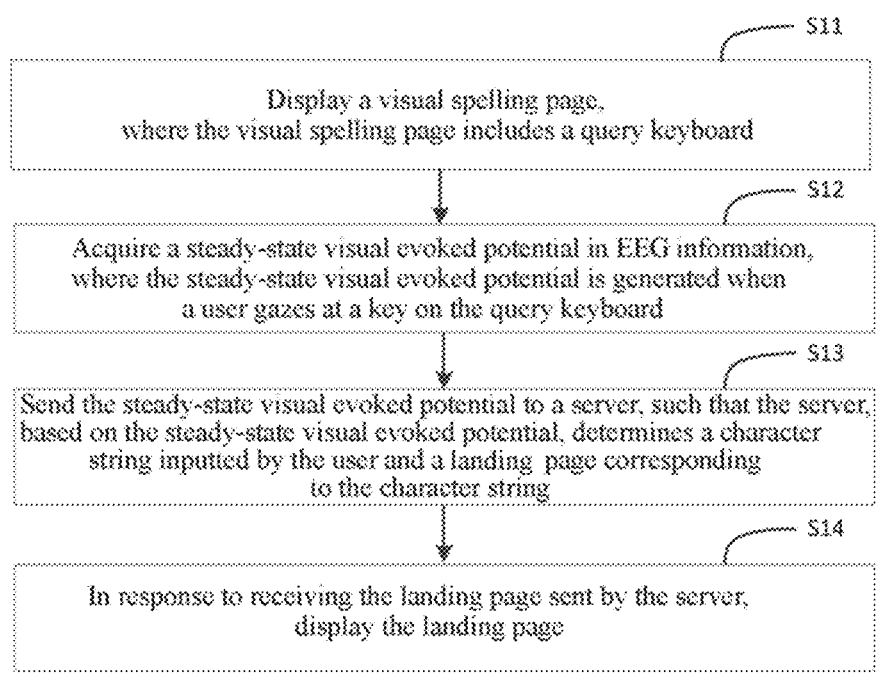
FIG. 2 illustrates a flow chart of the web search method according to an embodiment of the present disclosure.

FIG. 2 illustrates a flow chart of a web search method according to an embodiment of the present disclosure. The web search method may be applied to a user interface. The user interface may be User Equipment (UE), a mobile device, a user interface, a terminal, a cellular phone, a cordless phone, a Personal Digital Assistant (PDA), a handheld device, a computing device, a vehicle-mounted device, a wearable device, and the like. The method may be implemented by invoking computer-readable instructions ranked in a memory through a processor. As an example, the web search method in the embodiment of the present disclosure is described below by taking the user interface serving as an execution body.

As shown in FIG. 2, the web search method includes following steps S11 to S14.

In step S11, a visual spelling page is displayed, where the visual spelling page includes a query inputting keyboard.

In step S12, a steady-state visual evoked potential in the EEG information is acquired, where the steady-state visual evoked potential is generated when a user gazes at keys on the query inputting keyboard.

In step S13, the steady-state visual evoked potential is sent to the server, such that the server, based on the steady-state visual evoked potential, determines a character string inputted by the user, and a landing page corresponding to the character string.

In step S14, in response to receiving the landing page sent by the server, the landing page is displayed.

For example, in the step S11, the visual spelling page may be displayed on a display of the user interface, and the visual spelling page may include a virtual query inputting keyboard. The query inputting keyboard may be a keyboard based on the Steady-State Visual Evoked Potential (SS- VEP), and may establish a connection with the user's brain through a Brain Computer Interface (BCI) of the user interface, such that the query inputting keyboard may be operated directly through the thought in/from the user's brain without hand-based operations.

The query inputting keyboard may include a plurality of key positions. Each key position has flicker with a different frequency, which may correspond to a different key position function. As the retina is stimulated with an intensity of flash or pattern in a visual field of human, potential changes may be recorded in the visual cortex. Therefore, when the user pays attention to a key position flickering at a certain frequency, a visual area in the brain may be induced to generate an SSVEP EEG signal with an equal frequency (or a multiple of the frequency), i.e., SSVEP harmonic waves.

In a scenario where the visual spelling page in the step S11 may display the query inputting keyboard, in order to acquire a key that is expected to be clicked by the user in a case where the user cannot perform the hand-based operations (e.g., VR applications, disabled service), the SSVEP EEG signal generated when the user gazes at the key on the query inputting keyboard may be acquired in the step S12. The SSVEP EEG signal is a response of human to a visual stimulation at a certain frequency. When the retina is subjected to a visual stimulation of 3.5 Hz to 75 Hz, the visual cortex of the brain may generate EEG signals with the same frequency as the visual stimulation (or a multiple of the frequency).

Figure 3:
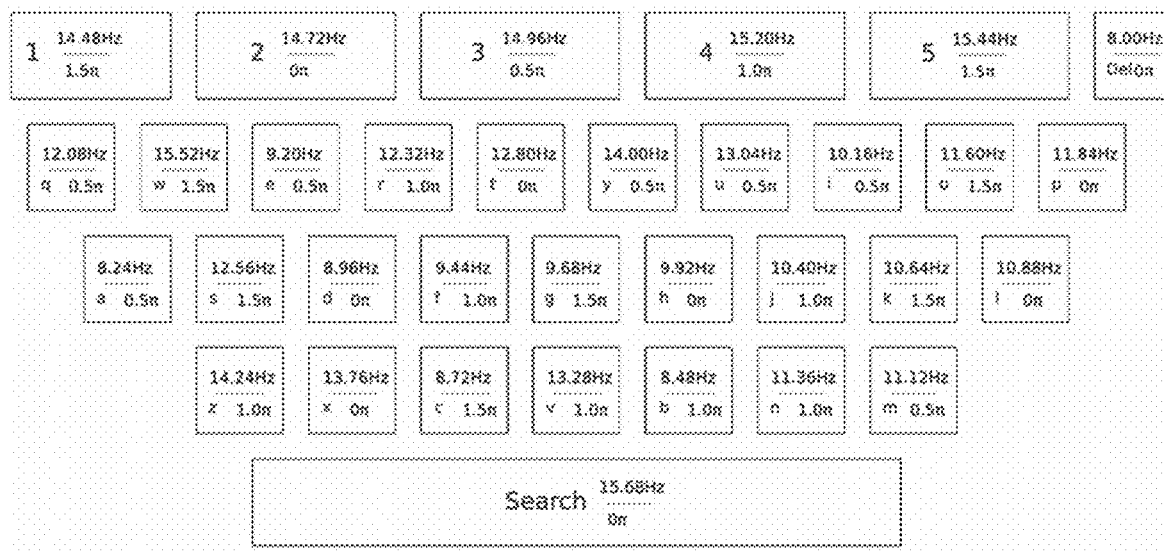
FIG. 3 illustrates a schematic diagram of a query keyboard according to an embodiment of the present disclosure.

As an example, the query inputting keyboard contains 33 stimulation frequencies, and FIG. 3 illustrates a schematic diagram of the query inputting keyboard according to an embodiment of the present disclosure. As shown in FIG. 3, the frequency range of a flicker block (i.e., the key position) of the query inputting keyboard may be 8-15.68 Hz. One key position may be arranged every 0.24 Hz, and a phrase difference between every two adjacent key positions is $0.5\pi$. The QWERT keyboard layout, i.e., a full keyboard layout with first six letters Q, W, E, R, T, Y in the first row, may be used. The search keyboard includes 5 numeric keys (key positions from "1" to "5"), 26 letter keys (key positions from "a" to "z") and 2 functional keys (a delete key "Del" and a search key "Search").

When the visual spelling page displays the query inputting keyboard shown in FIG. 3, the user may gaze at the flicker key position "a" in the query inputting keyboard to input the character string "a", and the user interface may acquire the SSVEP EEG signal corresponding to the key position "a". Similarly, SSVEP EEG signals corresponding to different key positions may be acquired by gazing at different key positions on the query inputting keyboard.

The user interface may send the SSVEP EEG information acquired in real time in the step 12 to the server in real time in the step 13. The server may invoke an identifying method stored therein to analyze the received SSVEP EEG signal in real time, to determine the user's intention on the key position to be inputted, thereby determining the character string inputted by the user.

The SSVEP EEG identifying algorithm stored by the server may include a non-training method and a supervised training method.

The non-training method may include Minimum Energy Combination (MEC), Canonical Correlation Analysis (CCA), Multivariate Synchronization Index (MSI), Filter Bank Canonical Correlation Analysis (FBCCA), Canonical Variates with Auto Regressive Spectral Analysis (CVARS), and the like.

The supervised training method may include Task-Related Component Analysis (TRCA), Multi-Stimulus Task-Related Component Analysis (MSTRCA), Extended CCA, modified Extended CCA (m-Extended CCA), L1-regularized Multiway CCA (L1MCCA) and Individual Template-Based CCA (ITCCA), and the like.

It should be understood that the present disclosure does not limit a specific method for identifying the character string inputted by the query inputting keyboard according to the SSVEP EEG information.

The method for identifying the character string inputted by the query inputting keyboard according to the SSVEP EEG information is described below by taking the Canonical Correlation Analysis (CCA) as an example.

The CCA method is a non-training method for calculating a typical correlation coefficient between the SSVEP EEG signal collected in real time and a reference signal (a theoretical SSVEP EEG signal induced by flickers at different frequencies). The reference signal may include a constructed sine and cosine signal, and a flicker block (key position) corresponding to a maximal value of this correlation coefficient is the input intention of the user.

The SSVEP signal may be expressed by a matrix S:

$$S=(x_1,x_2,x_3,\ldots x_9)^T \qquad (1)$$

In the formula (1), the matrix S is a matrix of 9*Ns, where Ns is the number of sampling points, and each row of the matrix represents a signal channel for EEG collection.

The reference signal $R_f$ may be expressed by a matrix of Ns*10, where Ns is the number of sampling points in the SSVEP signal, and the reference signal $R_f$ may be expressed by the following formula:

$$R_f = \begin{bmatrix} \sin(2\pi ft) \\ \cos(2\pi ft) \\ \vdots \\ \sin(2\pi Nft) \\ \cos(2\pi Nft) \end{bmatrix}, t = \frac{1}{F_s}, \frac{2}{F_s} \cdots \frac{N_s}{F_s} \qquad (2)$$

In the formula (2), N is the number of harmonic waves. For example, N may be set to 10. f is a frequency of the reference signal. Fs is a sampling rate, and Ns is the number of sampling points.

For each flicker frequency from 8 Hz to 15.68 Hz (such as f=8.00, 8.24, 8.48 . . . 15.68), the reference signal $R_f$ may be generated by using the above formula. The correlation between each reference signal $R_f$ and the SSVEP EEG signal S is then calculated. After calculation, the reference signal $R_f$ with the highest correlation may be selected as an identification result, that is, a target key position that the user intends to input may be obtained, and then the character string inputted by the user is obtained.

After the server determines the character string inputted by the user, the server may directly search the character string inputted by the user on the Internet, and determine a page with the highest correlation to the character string inputted by the user as the landing page. For example, if the character string inputted by the user is "cctv", the server may directly search "cctv" to obtain the landing page corresponding to "cctv", i.e., the official website page of China Central Television (CCTV).

Alternatively, the server may determine at least one query term corresponding to the character string based on the character string. The server may then search on the Internet based on the at least one query (at least one term) corresponding to the character string to obtain the landing page corresponding to the character string.

In a possible implementation, the visual spelling page also includes a query suggestion module, and the step S13 may include:
- a step S131: sending the steady-state visual evoked potential to the server, such that the server, according to the steady-state visual evoked potential, determines the character string inputted by the user and at least one query term corresponding to the character string;
- a step S132: in response to receiving the character string and the at least one query term sent by the server, displaying the character string and the at least one query term by the query suggestion module;
- a step S133: acquiring a search context in the EEG information, where the search context includes user state information, knowledge level, position, time, etc.; and
- a step S134: sending the search context to the server, such that the server determines the landing page based on the at least one query term and the search context.

For example, the visual spelling page of the user interface may display the query inputting keyboard for inputting the character string without hand-based operations, and may also include the query suggestion module configured to perform query recommendation according to the character string inputted by the user in combination with massive data of the Internet.

In the step S131, the user interface may send the steady-state visual evoked potential to the server, and the server determines the character string inputted by the user based on the steady-state visual evoked potential. The specific process may refer to the above SSVEP EEG information classification or identification algorithm, which is not repeated herein.

The server receives the character string, and may determine at least one query term corresponding to the character string according to the character string. In a general search scenario, a user may have a complicated search intention, so the character string may hardly match the information needs of the user. Therefore, the query recommendation technology stored by the server may be used to provide candidate queries, to help to find the desirable query term of the user with less effort. The search recommendation technology may use a trained recommendation model to acquire at least one query term. Massive network data and large-scale heterogeneous data on the Internet, combined with user behavior analysis such as user clicks, query formulation, hot news tracking and so on, are used in the process of training the recommendation model, which helps to reduce the difference between the user intention and the candidate queries effectively.

For example, assuming that the character string inputted by the user is "liebao", the "liebao" may be inputted to the recommendation model stored in the server, and at least one query term corresponding to the character string may be obtained, such as cheetah, Cheetah Browser, Cheetah Motors, and the like.

In the step S132, after analyzing the character string and the at least one query term corresponding to the character string, the server may send the character string and the at least one query term corresponding to the character string to the user interface. In response to receiving the character string and the at least one query term sent by the server, the user may select and display the character string and the at least one query term in the query suggestion module.

For example, the server may also send the query terms such as cheetah, Cheetah Browser, Cheetah Motors and the like to the user interface, and the query suggestion module of the visual spelling page in the user interface may display the query terms such as cheetah, Cheetah Browser, Cheetah Motors and the like.

In the step S133, the user terminal may acquire a search context in the EEG information, and the search context may be a search context collected when the user gazes at the query keyboard, or a search context collected when the user gazes at the query suggestion module. The search context may be used to determine state information (such as a rest state, an entertainment state, a sports state, or a working state) of the user. The search context in the EEG information may be extracted by a pre-trained machine learning model or relevant algorithms, which is not limited herein.

In the step S134, the search context is sent to the server, and the server determines the landing page according to the at least one query term and the search contexts.

For example, the user interface may collect the EEG information when the user gazes at the query suggestion module and send it to the server in real time. The server may analyze the received EEG information generated when the user gazes at the query suggestion module. Assuming that the server analyzes that the user is currently in a working state. Among the query terms such as cheetah, Cheetah Browser, Cheetah Motors, and the like, the user's search intent may be related to Cheetah Browser. As such, search may be performed on "Cheetah Browser", and an official website of the Cheetah Browser may be selected as the landing page.

For another example, it is possible to analyze the user's attention to cheetah, Cheetah Browser and Cheetah Motors through eye movement signals of the user, and search for the query term with the highest attention to determine the landing page.

Therefore, in comparison to the related art where it is necessary to use an input method (Pinyin input method or Wubi input method) to convert the character string into a key word, and then provide query recommendations for the key word, in an embodiment of the present disclosure, by inputting the character string, at least one query term may be directly displayed on the user interface to directly provide query recommendations, which helps to improve the search efficiency and the user experience.

In the step S13, the server determines the landing page. In the step S14, the user interface may display the landing page on the display of the user interface in response to receiving the landing page sent by the server. For example, given that the landing page is the official website of the Cheetah Browser, the official website page of the Cheetah Browser may be displayed.

Through the steps S11 to S14, web pages may be retrieved and browsed without hand-based operations. Moreover, in comparison to the related art where a Search Engine Result Page (SERP) containing a plurality of search results is directly displayed after a query term is inputted, and it is necessary to browse the search engine result page repeatedly to select and click each search result that may meet the information needs of the user, to get the page that meet the information needs of the user; according to the embodiments of the present disclosure, after the character string is inputted, a landing page that is most likely to directly meet the information needs of the user may be displayed, which helps to meet the information needs of the user with minimal pages, making the search process efficient and rapid.

Furthermore, it is conducive to detecting search feedback in real time when the search engine result page is displayed subsequently, to adjust the search results dynamically, reducing complexity in an interactive operation of the user during network search, and improving the search experience of the user.

It should be understood that in the steps S11 to S14, without hand-based operations, web page search may be performed based on the EEG information, and may also be performed using both the EEG information and the eye movement information, thereby improving the search experience.

In a possible implementation, the acquiring the eye movement information, and sending the steady-state visual evoked potential to the server, such that the server, based on the steady-state visual evoked potential, determines the character string inputted by the user, includes: sending the steady-state visual evoked potential and the eye movement information to the server, such that the server determines the character string inputted by the user based on the steady-state visual evoked potential and the eye movement information.

The eye movement information may include an eyeball position and an eyeball movement feature tracked and measured by an eye movement meter. The eye movement information may be used to track an attention of the user in real time, to correspond the attention of the user to the content on a display interface.

For example, assuming that the user wants to input the character "a", eyes of the user may be focused on a key position "a" (such as a first key position of a third row in FIG. 3) of the query inputting keyboard on the display, and the user interface may acquire the eye movement information and the SSVEP EEG information of the user.

The user interface may send the eye movement information and the SSVEP EEG information to the server. After receiving these two kinds of information, the server may analyze the eye movement information and the SSVEP EEG information, and may determine the character inputted by the user as "a" in a case where the position indicated by the eye movement information corresponds to the position of the key position "a", and the frequency of the SSVEP EEG information is the same as (or a multiple of) the flicker frequency of the key position "a", which helps to improve the character input accuracy. The user may also determine the character inputted by the user as "a" when the position indicated by the eye movement information corresponds to the position of the key position "a", or the frequency of the SSVEP EEG information is the same as (or a multiple of) the flicker frequency of the key position a, which helps to improve the character input efficiency. It should be understood that the present disclosure does not limit a specific method for determining the inputted character based on the eye movement information or the EEG information.

In this way, the character input speed and accuracy may be improved.

After the landing page is displayed by the steps S11 to S14, if the user is dissatisfied with the displayed landing page, the search engine result page may also be acquired through the steps S15 to S17 so as to meet the information needs of the user.

In a possible implementation, the steps S15 to S17 include:
    step S15: acquiring the EEG information, where the EEG information is generated when the user gazes at the landing page;
    step S16: sending the EEG information to the server, such that the server detects the user's feedback information in response to the landing page based on the EEG information, and determines the search engine result page based on the feedback information;
    wherein the feedback information includes emotion information determined based on the EEG information, and the search engine result page includes at least two search results corresponding to the character string; and
    step S17: in response to receiving the search engine result page sent by the server, displaying the search engine result page.

For example, given that the character string inputted by the user is "liebao", the landing page displayed by the user interface is a page introducing the cheetah (an animal belonging to the feline acinonyx). In the step S15, the user interface may collect the EEG information generated when the user browses the page introducing the cheetah animal.

In the step S16, the user interface may send the collected EEG information, i.e., the EEG information generated when the user browses the page introducing the cheetah animal to the server. The server may detect the user's feedback information in response to the page introducing the cheetah animal based on the received EEG information, and the feedback information may include emotion information of the user in response to the page introducing the cheetah animal. The emotion information may indicate the degree of user satisfaction in response to the landing page, including satisfaction or dissatisfaction.

If the feedback information is dissatisfaction, after the user closes the page, a search engine result page including at least two search results corresponding to "liebao" may be determined. For example, the search engine result page may include search results such as Cheetah Browser, Cheetah Motors, and the like. In the search engine result page, the search results with a larger difference from the landing page in terms of a subject will be ranked in top positions, thus more diversified search results are ranked in the top positions to meet the information needs of the user effectively.

If the feedback information is satisfaction, after the user closes the page, the search results related to this landing page will be ranked in top positions. For example, in the search engine result page, the search results related to the cheetah animal (for example, including regional distribution of the cheetah, classification of the cheetah and other search results) may be ranked in top positions. The system may detect the feedback signal as "satisfaction" about the cheetah animal.

The emotion information in the EEG information may be extracted by a pre-trained machine learning model or relevant algorithms, which is not limited herein.

In the step S17, after determining the search engine result page, the server may send the search engine result page to the user interface. The user interface may display the search engine result page in the display. For example, the user interface may display the search engine result page including the search results such as Cheetah Browser, Cheetah Motors and the like in the display.

In this way, in a case where the landing page cannot meet the information needs of the user, more and richer search results may be provided to meet the information needs of the user, thereby improving the user experience.

In the process of steps S15 to S17, the user may perform an interactive operation on the landing page and the search engine result page.

In a possible implementation, the method further includes: in a case where the eye movement information and/or the EEG information indicates paying attention to a preset area in the landing page, displaying a landing keyboard in the landing page, where the landing keyboard includes at least one key position, and each key position corresponds to a different operation; and based on the eye movement information and/or the EEG information, determining a selected key position, and executing an operation corresponding to the key position.

Figure 4:
FIG. 4 illustrates a schematic diagram of a landing page according to an embodiment of the present disclosure.

For example, FIG. 4 illustrates a schematic diagram of the landing page according to an embodiment of the present disclosure. As shown in FIG. 4, when the whole landing page is viewed completely or the current page displayed on the screen is viewed completely, the user may move the sight to a blank area (a preset area) at the right side of the web page, the search system may display the landing keyboard automatically, and respective key positions (which may be flicker blocks with different flickering frequencies) displayed on the landing keyboard may be used to execute operations on the landing page. For example, the landing keyboard may include 3 key positions, i.e. flicker blocks corresponding to functions such as "close", "slide up", "slide down" and the like shown at the right side of FIG. 4.

The preset area may be a blank area on the right side, or an area with a preset icon. The preset area is not limited herein.

It should be understood that the flicker blocks of the landing keyboard may have the same working principle as the key positions in the query inputting keyboard in FIG. 3, and may refer to the SSVEP EEG information recognition algorithm of the query inputting keyboard above. In addition, a dual-modality feature of the EEG information and the eye movement information may also be used to determine the control logic, which is described above. The flicker blocks may be any frequency from 3.5 Hz to 75 Hz, and the size, color and specific frequency of the flicker blocks are not limited herein.

Furthermore, the user interface may collect the EEG information of the user in real time and send it to the server, and the server may detect the degree of satisfaction, emotion and the like of the user in real time when the user browses the page. If the server detects "dissatisfaction" as the user's feedback during browsing, the server may skip to the search engine result page to display more diversified search results after the user executes a closing operation.

In this way, web pages may be browsed and interacted without hand-based operations, which is helpful for the physically challenged who cannot use the keyboard or mouse and the healthy group in a special scenario (two hands are in a non-idle state) to normally browse web pages.

In a possible implementation, in a case where the eye movement information and/or the EEG information indicates paying attention to a preset area in the search engine result page, at least one search engine result keyboard is displayed, where each search engine result keyboard includes at least one key position, and each key position corresponds to a different operation. Based on the eye movement information and/or the EEG information, the selected key position is determined, and the operation corresponding to the key position is executed.

Figure 5:
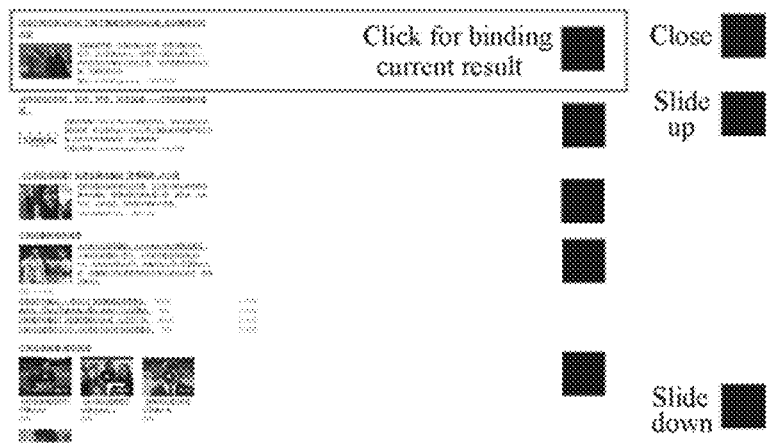
FIG. 5 illustrates a schematic diagram of a search engine result page according to an embodiment of the present disclosure.

For example, FIG. 5 illustrates a schematic diagram of the search engine result page according to an embodiment of the present disclosure. As shown in FIG. 5, when the user browses the search engine result page, each key position (which may be a flicker block) in FIG. 5 may be used to execute an operation on the search engine result page. When the sight of the user is moved to the blank area (the preset area) on the right side, besides the flicker blocks of the three functional keys of "close", "slide-up", and "slide-down", the display interface may also display the flicker block with a fixed frequency, to bind a click behavior of the user on the result. The flicker blocks including three functional keys of close, slide-up, and slide-down may be regarded as one keyboard, and a plurality of flicker blocks that are bonded with the current search result may be regarded as one keyboard. The present disclosure does not limit the number of the search engine result keyboards, and the number of key positions included in the search engine result keyboard.

The preset area may be a blank area at the right side, or an area with a preset icon. The preset area is not limited herein.

It should be understood that the flicker blocks of the search engine result keyboard may have the same working principle as the key positions in the query inputting keyboard in FIG. 3 and may refer to the SSVEP EEG information recognition algorithm of the query inputting keyboard above. In addition, the dual-modality feature of the EEG information and the eye movement information may also be used to determine the control logic, which is not repeated herein. The flicker block may be any frequency from 3.5 Hz to 75 Hz, and the size, color, and specific frequency of the flicker block are not limited herein.

Furthermore, when the user slides down the search engine result page, the EEG information in response to the landing page and the displayed search result may be considered comprehensively in the search results, to adjust the ranking strategy of the newly-loaded content dynamically.

In this way, interactive operations of web page search and browsing may be performed without hand-based operations, which is helpful for the disabled people who cannot use the keyboard or mouse, and the healthy people in a special scenario (two hands are in a non-idle state) to normally browse the web pages.

Through the steps S11 to S17, the web search method in an embodiment of the present disclosure is described by taking the user interface as an execution body. The web search method in an embodiment of the present disclosure is described below by taking the server as an execution body.

Figure 6:
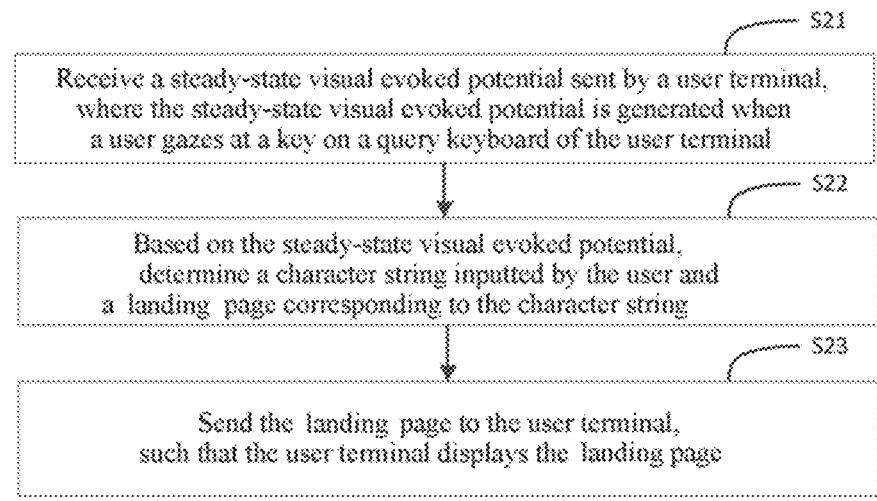
FIG. 6 illustrates a flow chart of another web search method according to an embodiment of the present disclosure.

FIG. 6 illustrates a flow chart of the web search method according to an embodiment of the present disclosure. The method is applied to the server. As shown in FIG. 6, the method includes following steps.

In step S21, a steady-state visual evoked potential sent by a user interface is received, where the steady-state visual evoked potential is generated when the user gazes at keys on a query inputting keyboard of the user interface.

In step S22, based on the steady-state visual evoked potential, a character string inputted by the user and a landing page corresponding to the character string are determined.

In step S23, the landing page is sent to the user interface, such that the user interface displays the landing page.

For example, the steady-state visual evoked potential received by the server is generated when the user gazes at a query inputting keyboard shown in FIG. 3. The server may receive SSVEP EEG information sent by the user interface in real time. For example, if the user gazes at a key position "1" on the query inputting keyboard first, the server receives the SSVEP EEG information corresponding to the key position 1 in real time, and determines the character inputted by the user as "1" according to the SSVEP EEG information. If the user gazes at a key position "b" on the query inputting keyboard, the server receives the SSVEP EEG information corresponding to the key position b in real time, and determines the character inputted by the user as "b" according to the SSVEP EEG information. It may be seen that the character string inputted by the user may be determined as "lb" according to the SSVEP EEG information received in real time, and the character string "lb" may be searched for directly on the Internet to determine the landing page (such as a page introducing cheetah the animal) corresponding to "lb".

After determining the landing page, the server may send the landing page to the user interface, and the user interface displays the landing page.

Through the steps S21 to S23, the web pages may be retrieved and browsed without hand-based operations. In the related art, the search engine result page containing a plurality of search results is directly displayed after the query term is inputted, and it is necessary to browse the search engine result page repeatedly, select and click various search results that may meet the user's information needs, and obtain a page meeting the user's information needs. In contrast, according to the embodiments of the present disclosure, after the character string is inputted by the user, the landing page most likely to meet the user's information needs may be determined directly, which helps to meet the user's information needs with minimal pages, thereby meeting the user's information needs efficiently and rapidly, reducing complexity in the interactive operations during network search, and improving the search experience.

It should be understood that in the above process, in the step S22, retrieval on the character string may be directly performed on the Internet to determine the character string. In order to improve the accuracy of the retrieval, the query recommendations may also be performed firstly based on the character string, and then the retrieval is performed on the Internet.

In a possible implementation, the step S22 may include: based on the steady-state visual evoked potential, determining the character string inputted by the user and at least one query term corresponding to the character string; sending the character string and the at least one query term corresponding to the character string to the user interface, so that the user interface displays the character string and the at least one query term in a query suggestion module of a visual spelling page; receiving a search context sent by the user interface, where the search context includes user state information; and determining the landing page based on the at least one query term and the search context.

For example, the based on the steady-state visual evoked potential, determining the character string inputted by the user and the at least one query term corresponding to the character string, includes: determining the character string inputted by the user based on the steady-state visual evoked potential; and determining at least one query term corresponding to the character string based on a candidate word generation algorithm with massive information on the Internet.

The server may determine one character string according to the received SSVEP EEG information, and may determine at least one query term corresponding to the character string.

In a general search scenario, a user generally has a complicated search intention, and the character string may hardly match the information needs of the user accurately. Therefore, the search recommendation technology stored in the server may be used. For example, a candidate word generation algorithm with massive information on the Internet may be used to provide candidate queries to help the user to find the desirable query term with less effort.

The candidate word generation algorithm with massive information on the Internet may acquire at least one query term through a trained recommendation model. Massive network data and large-scale heterogeneous data on the Internet, combined with user behavior analysis such as clicks, query formulation, hot news tracking and so on are used in the process of training the recommendation model, which can reduce the difference between the user intention and the candidate queries effectively, and obtain at least one query term meeting the user intention.

For example, if the character string inputted by the user is "liebao", "liebao" may be inputted to the recommendation model stored in the server, and the query term corresponding to the character string is obtained, including cheetah, Cheetah Browser, Cheetah Motors, and the like.

After analyzing the character string and the at least one query term corresponding to the character string, the server may send the character string and the at least one query term corresponding to the character string to the user interface. In response to receiving the character string and the at least one query term sent by the server, the user interface may display the character string and the at least one query term in the query suggestion module.

For example, the server may also send the query terms including cheetah, Cheetah Browser, Cheetah Motors and the like to the user interface, and the query terms including cheetah, Cheetah Browser, Cheetah Motors and the like may be displayed in the query suggestion module of the visual spelling page of the user interface, and the user interface may acquire a search context in the EEG information, and the search context may be a search context collected when the user gazes at the query inputting keyboard, or a search context collected when the user gazes at the query suggestion module. The search context may be used to determine state information (such as a rest state, an entertainment state, a sports state, or a working state) of the user.

The server may receive the search context sent by the user interface, and determine the landing page based on the at least one query term and the search context. For example, the user interface may collect the EEG information when the user gazes at the query suggestion module and send it to the server in real time. The server may analyze the received EEG information when the user gazes at the query suggestion module. If it is analyzed by the server that the user is in a working state at present and the user intends to use the Cheetah Browser to work among the query terms such as cheetah, Cheetah Browser, Cheetah Motors, and the like, then the search may be performed on the topic of Cheetah Browser, and an official website of the Cheetah Browser is determined as the landing page.

Therefore, in comparison to the related art where it is necessary to use an input method (Pinyin input method or Wubi input method) firstly to convert the character string into a key word, and then provide query recommendations for the key word, query recommendations are realized directly by inputting the character string in the embodiment of the present disclosure, since at least one query term may be displayed on the user interface by inputting the character string, which helps to improve the query efficiency and the user experience.

It should be understood that in the above process, the server may determine the character string inputted by the user based on the steady-state visual evoked potential; the server may also receive the eye movement information sent by the user interface, and determine the character string inputted by the user based on the steady-state visual evoked potential and the eye movement information. The method for determining the character string inputted by the user based on the steady-state visual evoked potential and the eye movement information may refer to the relevant part of the user interface, which is not repeated herein.

The character string is inputted by using both the EEG information and the eye movement information, which may improve the efficiency and accuracy of character string input.

In the steps S21 to S23, after the landing page is determined, the user interface may display the landing page, and a degree of user satisfaction in response to the landing page may be detected in real time through the received EEG information. The search engine result page may also be determined through the steps S24 to S27, to meet the information needs of the user. The search result may be adjusted dynamically according to the user's feedback about the search that is detected in real time.

In a possible implementation, the steps S24 to S27 include:

in the step S24, the EEG information sent by the user interface is received, where the EEG information is generated when the user gazes at the landing page of the user interface;

in the step S25, the user's feedback information in response to the landing page is detected based on the EEG information, where the feedback information includes emotion information determined based on the EEG information;

in the step S26, the search engine result page is determined based on the feedback information, where the search engine result page includes at least two search results corresponding to the character string; and in the step S27, the search engine result page is sent to the user interface, such that the user interface displays the search engine result page.

For example, assuming that the character string inputted by the user is "liebao", the landing page displayed by the user interface is a page introducing the cheetah (an animal belonging to the feline acinonyx).

In the S24, the server may receive the EEG information sent by the user interface in real time, and the EEG information received by the server is the EEG information generated when the user browses the page introducing cheetah the animal.

In the step S25, the server may detect the user's feedback information in response to the page introducing cheetah the animal based on the received EEG information, and the feedback information may include the user's emotion information in response to the page introducing cheetah the animal.

In a possible implementation, the step S25 includes: inputting the EEG information to a satisfaction predicting module to determine a degree of user satisfaction; based on the eye movement information and/or the EEG information, determining a corresponding relationship between the degree of user satisfaction and each text content in the landing page; and determining the feedback information based on the degree of user satisfaction corresponding to each text content in the landing page.

For example, the server may receive, in real time, the EEG information generated when the user browses an optimal landing page, and may input the obtained EEG information to the satisfaction predicting model obtained by supervised training, and the satisfaction predicting model is used to analyze the EEG information of the user to estimate the degree of user satisfaction in real time.

For example, given that the landing page is a page introducing cheetah the animal, and the trained satisfaction predicting model is stored in storage of the server, the server may receive the EEG information generated when the user browses the cheetah in real time, and input the EEG information acquired in real time to the satisfaction predicting model. As the page introducing cheetah the animal contains massive information, when the user is satisfied with the browsed text content (phrases, sentences, paragraphs, and the like), the degree of user satisfaction outputted by the satisfaction predicting model is higher than a preset threshold. When the user is dissatisfied with the browsed text content (phrases, sentences, paragraphs, and the like), the degree of user satisfaction outputted by the satisfaction predicting model is lower than the preset threshold.

The EEG information generated when a large number of users browse the web pages and corresponding satisfaction tags and labels may be used as the training data of the satisfaction predicting model, and the training data may be used to train the satisfaction predicting model to obtain the trained satisfaction predicting model.

It should be understood that the EEG information included in the training data may contain one or more features of time domain, frequency domain and space domain, and the satisfaction predicting model may be a series of classification or regression models such as a traditional model, a neural network model and the like, and may be used to predict whether the user is satisfied or a degree of user satisfaction. The present disclosure does not limit the specific content of the training data and the specific structure of the satisfaction predicting model.

The server may detect the degree of user satisfaction in real time by analyzing the EEG information through the satisfaction predicting model, and the server may also acquire the text content of the user's attention in real time based on the eye movement information. Therefore, the degree of user satisfaction may correspond to more fine-grained text content (phrases, sentences, paragraphs, and the like) by combining eye movement behavior contained in the user's eye movement information with the EEG information. For example, if it is determined by the server that the user is interested in a first phrase in the $N^{th}$ row of the page through the eye movement behavior, and then a text content corresponding to the position of interest and a degree of user satisfaction in response to the text content are determined.

Based on the satisfaction corresponding to each text in the landing page, the feedback information may be determined. The feedback information may include the user's emotion information in response to the page introducing the cheetah animal, and the emotion information is the degree of user satisfaction in response to each text in the landing page.

In this way, the degree of user satisfaction may correspond to the more fine-grained text content, which helps to subsequently acquire the search engine result page that may better meet the information needs of the user.

In the step S26, if the feedback information is dissatisfaction, after the user closes the page, a search engine result page including at least two search results corresponding to "liebao" may be determined. For example, the search engine result page may include Cheetah Browser, Cheetah Motors and other search results.

In a possible implementation, the step S26 includes: determining a difference between a subject of each search result and a subject of each of the landing page; in a case where the feedback information is dissatisfaction, ranking the search results with a larger difference higher than the search results with a smaller difference, or in a case where the feedback information is satisfaction, ranking the search results with a larger difference lower than the search results with a smaller difference.

For example, assuming that the landing page is a page introducing the cheetah animal, if the user's feedback information in response to the landing page is dissatisfaction, it means that the topic of the landing page, that is, the cheetah animal, is not the information the user expects to acquire. The search engine result page includes various search results corresponding to the character string "liebao". For example, the search engine result page may include related subjects such as the cheetah animal, Cheetah Browser, Cheetah Motors and other search results.

The server may determine a difference between a subject of each search result in the search engine result page and a subject of each of the landing page. For example, if the difference between the search results of the subjects such as Cheetah Browser and Cheetah Motors and the subject of the landing page is high, ranking of the search results of the subjects such as Cheetah Browser and Cheetah Motors may be raised. If the difference between the search results of the subjects such as the cheetah animal (such as classification of the cheetah, color of the cheetah and other subjects) and the subject of the landing page is low, ranking of the search results of the subjects such as the cheetah animal may be lowered.

If the user's feedback information in response to the landing page is satisfaction, the subject of the cheetah animal of the landing page is the information the user expects to find. When the user wants to browse more content after closing the landing page, the server may rank search results with a smaller difference in the search engine result page from the subject of the landing page in the top positions to meet the information needs of the user.

In this way, the ranking of the search results in the search engine result page is adjusted according to the user's feedback information in response to the landing page, which helps to find the content to meet the user's information needs as soon as possible.

In the step S27, after determining the search engine result page, the server may send the search engine result page to the user interface, and the user interface may display the search engine result page on the display. For example, the search engine result page including the search results such as Cheetah Browser, Cheetah Motors and the like may be displayed on the user interface.

In this way, more and richer search results meeting the user's information needs may be provided in a case where the landing page cannot meet the user's information needs, thereby improving the user experience.

In the search engine result page, if the search results in top positions cannot meet the information needs of the user sufficiently, in order to further improve the search experience, the EEG information of the user may correspond to different search results to analyze the user's personalized preference for different search results, and re-rank each search result included in the search engine result page in real time.

In a possible implementation, the EEG information sent by the user interface is received in real time, where the EEG information is generated when the user browses the search engine result page displayed by the user interface; the user's preference information about the search result in the search engine result page is detected in real time based on the acquired EEG information; re-ranking of individual search results in the search engine result page is performed in real time based on the preference information; the re-ranked search engine result page is sent to the user interface, and the user interface displays the re-ranked search engine result page in real time.

For example, assuming that the search engine result page includes various search results corresponding to the character string "liebao", the server may receive the EEG information sent by the user interface in real time, and the EEG information is generated when the user browses the search engine result page displayed by the user interface.

The server may input the acquired EEG information to a trained network model for detecting the user's preference information, to detect the user's preference information about the search results in the search engine result page in real time. For the training method of the network model for detecting the user's preference information, reference is made to the satisfaction predicting model stated above, which is not repeated herein. The present disclosure does not limit the structure of the network model for detecting the user's preference information.

Re-ranking of respective search results in the search engine result page may be performed in real time based on the obtained user's preference information about different search results. For example, assuming that the search engine result page includes search results related to the cheetah animal, Cheetah Browser and Cheetah Motors, the detected preference information is the search result related to the Cheetah Motors, and when the user selects to slide down the page to load more search results, the loaded content may be dynamically adjusted, and the search results related to the Cheetah Motors may be displayed in top positions.

The server may send the re-ranked search engine result page to the user interface, and the user interface may display the re-ranked search engine result page in real time.

In this way, the user's information needs are sufficiently satisfied.

In order to better understand the effect of the embodiment of the present disclosure, the network search method in the related art and the search method in the embodiment of the present disclosure are compared and described below.

Figure 7:
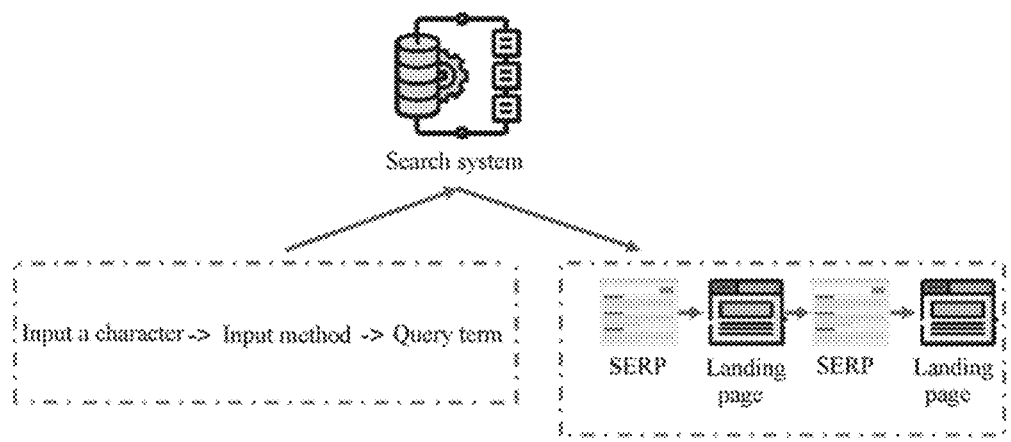
FIG. 7 illustrates a schematic diagram of a web search method according to the related art.

FIG. 7 illustrates a schematic diagram of the web search method according to the related art. As shown in FIG. 7, in the search system of the related art, the inputted character string is converted into the query term through an input method firstly, and the query term may be retrieved in the network. After the query term is inputted, the search system may display a search engine result page including a plurality of search results directly. Thus a user needs to browse and operate the search engine result page repeatedly to select a search result meeting the information needs, and the user also needs to access the landing page corresponding to each search result repeatedly. In this process, ranking of respective search results in the search engine result page stay the same.

Figure 8:
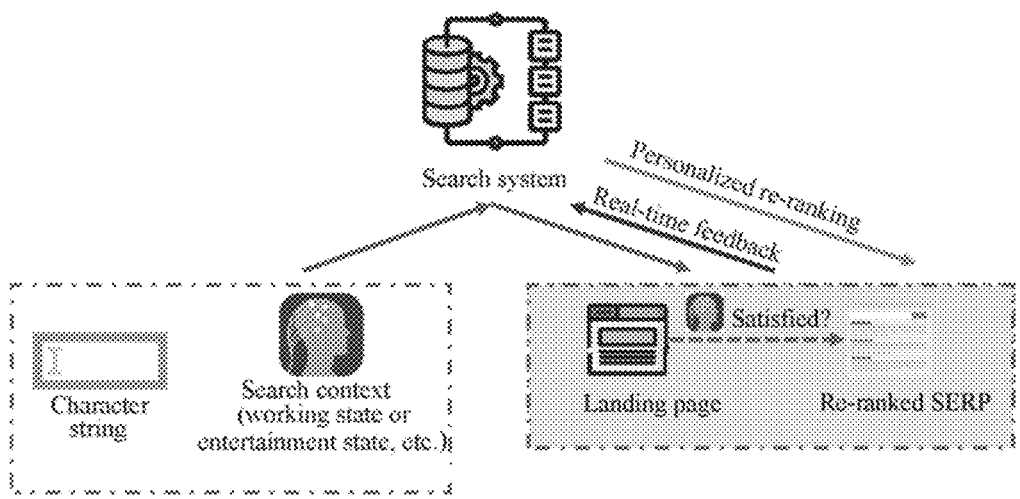
FIG. 8 illustrates a schematic diagram of a web search method according to an embodiment of the present disclosure.

FIG. 8 illustrates a schematic diagram of the web search method according to an embodiment of the present disclosure. As shown in FIG. 8, the web search method in an embodiment of the present disclosure does not need hand-based operations, and after the character string is inputted, the landing page that is most likely to meet the information needs of the user directly may be displayed. After the landing page is closed, in a process of displaying the search engine result page, the search system may not only adjust ranking of the search results in the search engine result page according to a degree of user satisfaction in response to the landing page, but also detect the user's feedback information (including the user's preference for each search result) in response to the search engine result page in real time, to perform personalized re-ranking on the search results in the search engine result page.

From the above, in embodiments of the present disclosure, a three-stage interaction method on the basis of query formulation, landing page examination, and SERP examination, which is capable of implementing query input and search engine control based on the EEG information and eye movement signals. During the interaction, the system may collect the user's EEG signals in real time, and decode the relevant signals to acquire the user's feedback, thereby improving the search experience through query recommendations, re-ranking of search results and the like.

In the process of query formulation, query recommendations may be provided for the user based on the inputted character string and together with current hot topics on the Internet, reducing a difference between the user intention and the inputted text effectively, and providing certain fault-tolerant capacity.

When the search results are ranked according to the query terms submitted by the user, the EEG information of the user generated when formulating the queries may be used as features, which may include the information needs of the user, a search context and other sufficient user-side information, thereby providing valuable feature input for the ranking of the search engine results. Moreover, during the interaction of re-ranked SERP examination, the EEG information may be decoded in real time to acquire a degree of satisfaction, emotion state and other high-grade cognition activities of the user, and the ranking strategy of the search engine is adjusted dynamically according to the cognition feedbacks of the user, thereby meeting the information needs of the user effectively and efficiently.

Therefore, the web search method in the embodiments of the present disclosure may help the user to interact with the search engine (such as inputting a query, controlling a search, and the like) without hand-based operations through an interactive mode based on mainly the EEG information and in combination with the eye movement information, such that the information needs and feedback of the user are better understood, thereby meeting the information needs more efficiently. And it is helpful for the physically challenged who cannot use the keyboard or mouse, and the healthy people in special scenarios to perform web search and browsing normally. Embodiments of the present disclosure provide a theoretical paradigm for constructing a search engine based on a brain-computer interface, which has great market prospect with the marketization of EEG equipment.

It may be understood that the above method embodiments described in the present disclosure may be combined with each other to form different embodiments without departing from principles and logics, which are not repeated in the present disclosure for concise illustration. It may be appreciated by those skilled in the art that a specific execution sequence of various steps in the above method of specific implementations are determined on the basis of their functions and possible intrinsic logics.

Furthermore, the present disclosure further provides an apparatus, an electronic device, a computer-readable storage medium and a program for web search, all of which may be configured to implement any web search method provided by the present disclosure. For the corresponding technical solutions and descriptions, refer to the corresponding records in the method section, which will not be repeated here.

Figure 9:
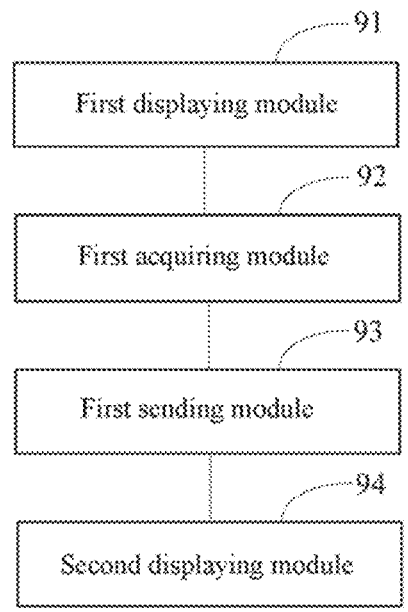
FIG. 9 illustrates a block diagram of a web search apparatus according to an embodiment of the present disclosure.

FIG. 9 illustrates a block diagram of a web search apparatus according to an embodiment of the present disclosure. The apparatus is applied to a user interface. As shown in FIG. 9, the apparatus includes:

a first displaying module 91 configured to display a visual spelling page, where the visual spelling page includes a query inputting keyboard;

a first acquiring module 92 configured to acquire a steady-state visual evoked potential in EEG information, where the steady-state visual evoked potential is generated when a user gazes at keys on the query inputting keyboard;

a first sending module 93 configured to send the steady-state visual evoked potential to a server, such that the server, based on the steady-state visual evoked potential, determines a character string inputted by a user and a landing page corresponding to the character string; and a second displaying module 94 configured to display the landing page in response to receiving the landing page sent by the server.

In a possible implementation, the apparatus further includes: a second acquiring module configured to acquire EEG information after the landing page is displayed, where the EEG information is generated when the user gazes at the landing page; a second sending module configured to send the EEG information to the server, such that the server detects the user's feedback information in response to the landing page based on the EEG information, and determines a search engine result page based on the feedback information, where the feedback information includes satisfaction and emotion information determined based on the EEG information, and the search engine result page includes at least two search results corresponding to the character string; and a third displaying module configured to display the search engine result page in response to receiving the search engine result page sent by the server.

In a possible implementation, the visual spelling page also includes a query suggestion module, and the first sending module 93 is configured to: send the steady-state visual evoked potential to the server, such that the server, based on the steady-state visual evoked potential, determines the character string inputted by the user and at least one query term corresponding to the character string; display the character string and the at least one query term through the query suggestion module in response to receiving the character string and the at least one query term sent by the server; acquire a search context in the EEG information, where the search context includes user state information; and send the search context to the server, such that the server determines the landing page based on the at least one query term and the search context.

In a possible implementation, the apparatus is further configured to: acquire eye movement information, and the first sending module 93 is configured to send the steady-state visual evoked potential and the eye movement information to the server, such that the server determines the character string inputted by the user based on the steady-state visual evoked potential and the eye movement information.

In a possible implementation, the apparatus is further configured to: in a case where the eye movement information and/or the EEG information indicates paying attention to a preset area in the landing page display a landing keyboard in the landing page, where the landing keyboard includes at least one key position, and each key position corresponds to a different operation; and determine a selected key position according to the eye movement information and/or the EEG information, and execute an operation corresponding to the key position.

In a possible implementation, the apparatus is further configured to: in a case where the eye movement information and/or the EEG information indicates paying attention to a preset area in the search engine result page, display at least one search engine result keyboard, where each search engine result keyboard includes at least one key position, and each key position corresponds to a different operation; and determine a selected key position based on the eye movement information and/or the EEG information, and execute an operation corresponding to the key position.

Figure 10:
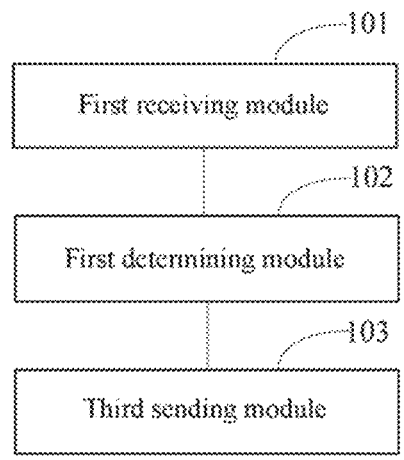
FIG. 10 illustrates a block diagram of another web search apparatus according to an embodiment of the present disclosure.

FIG. 10 illustrates a block diagram of a web search apparatus according to an embodiment of the present disclosure. The apparatus is applied to a server. As shown in FIG. 10, the apparatus includes:

a first receiving module 101 configured to receive a steady-state visual evoked potential sent by a user interface, where the steady-state visual evoked potential is generated when the user gazes at keys on a query inputting keyboard of the user interface;

a first determining module 102 configured to, based on the steady-state visual evoked potential, determine a character string inputted by the user and a landing page corresponding to the character string; and a third sending module 103 configured to send the landing page to the user interface, such that the user interface displays the landing page.

In a possible implementation, the apparatus further includes: a second receiving module configured to receive EEG information sent by the user interface, where the EEG information is generated when the user gazes at the landing page of the user interface; a detecting module configured to detect the user's feedback information in response to the landing page based on the EEG information, where the feedback information includes emotion information determined based on the EEG information; a second determining module configured to determine a search engine result page based on the feedback information, where the search engine result page includes at least two search results corresponding to the character string; and a fourth sending module configured to send the search engine result page to the user interface, such that the user interface displays the search engine result page.

In a possible implementation, the first determining module 102 is configured to: based on the steady-state visual evoked potential, determine the character string inputted by the user and at least one query term corresponding to the character string; send the character string and the at least one query term corresponding to the character string to the user interface, such that the user interface displays the character string and the at least one query term in a query suggestion module of a visual spelling page; receive a search context sent by the user interface, where the search context includes user state information; and determine the landing page based on the at least one query term and the search context.

In a possible implementation, the second determining module is configured to: determine a difference between a subject of each search result and a subject of each of the landing page; in a case where the feedback information is dissatisfaction, rank the search results with a larger difference higher than the search results with a smaller difference in the search engine result page, or in a case where the feedback information is satisfaction, rank the search results with a larger difference lower than the search results with a smaller difference in the search engine result page.

In a possible implementation, the apparatus is further configured to: receive the EEG information sent by the user interface in real time, where the EEG information is generated when the user browses the search engine result page displayed by the user interface; detect the user's preference information about the search results in the search engine result page in real time based on the acquired EEG information; re-rank respective search results in the search engine result page in real time; and send the re-ranked search engine result page to the user interface in real time, and the user interface displays the re-ranked search engine result page in real time.

In a possible implementation, the based on the steady-state visual evoked potential, determining the character string inputted by the user and the at least one query term corresponding to the character string, includes: determining the character string inputted by the user based on the steady-state visual evoked potential; and determining at least one query term corresponding to the character string based on a candidate word generation algorithm with massive information on the Internet.

In a possible implementation, the apparatus is further configured to: receive eye movement information sent by the user interface, and the first determining module 102 is configured to determine the character string inputted by the user based on the steady-state visual evoked potential and the eye movement information.

In a possible implementation, the detecting module is configured to: input the EEG information to a satisfaction predicting module to determine a degree of user satisfaction; determine a corresponding relationship between the degree of user satisfaction and each text content in the landing page based on the eye movement information and/or the EEG information; and determine the feedback information based on the degree of user satisfaction corresponding to each text content in the landing page.

In some embodiments, functions or modules of the apparatus provided in the embodiments of the present disclosure may be configured to execute the method described in the above method embodiments, through the methods described in the above descriptions of the method embodiments, which are not repeated here for brevity.

An embodiment of the present disclosure further provides a computer-readable storage medium having computer program instructions stored thereon, where the computer program instructions, when executed by a processor, implement the above method. The computer-readable storage medium may be a volatile or a non-volatile computer-readable storage medium.

An embodiment of the present disclosure further provides an electronic device, which includes a processor and a memory configured to store processor-executable instructions, where the processor is configured to call the instructions stored in the memory to execute the above method.

An embodiment of the present disclosure further provides a computer program, including computer-readable codes, or a nonvolatile computer-readable storage medium carrying the computer-readable codes, where when the computer-readable codes are executed in a processor of an electronic device, the processor in the electronic device executes the method.

The electronic device may be embodied as a terminal, a server or a device in any other form.

Figure 11:
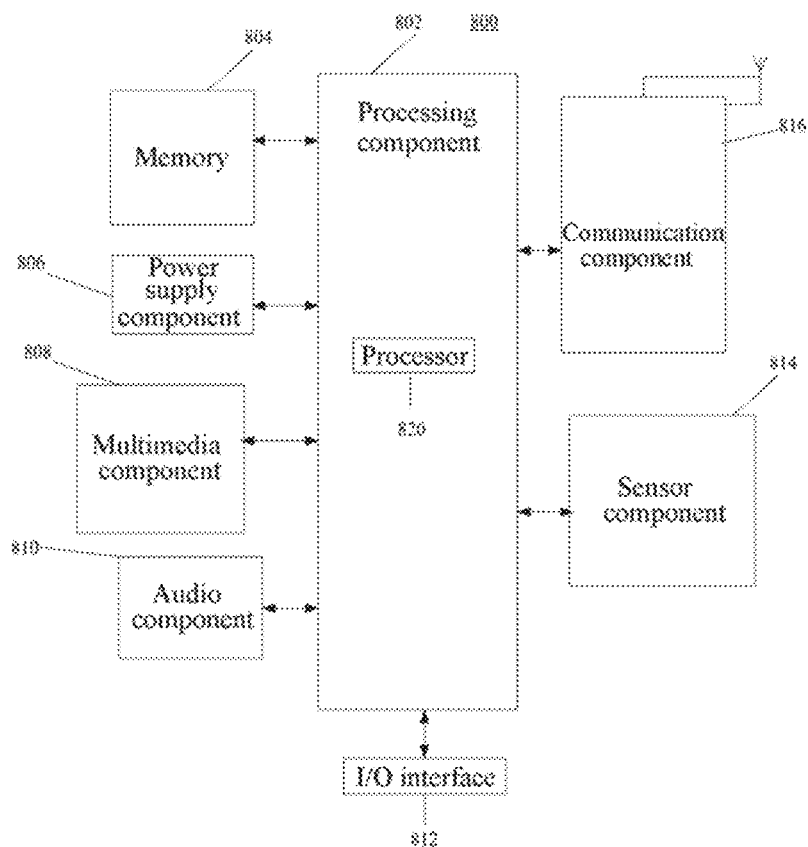
FIG. 11 illustrates a block diagram of an electronic device 800 according to an embodiment of the present disclosure.

FIG. 11 illustrates a block diagram of an electronic device 800 according to an embodiment of the present disclosure. For example, the electronic device 800 may be a mobile phone, a computer, a digital broadcast terminal, a message transceiver, a game console, a tablet device, a medical device, a fitness device, a personal digital assistant or any other terminal.

Referring to FIG. 11, the electronic device 800 may include one or more of the following components: a processing component 802, a memory 804, a power supply component 806, a multimedia component 808, an audio component 810, an input/output (I/O) interface 812, a sensor component 814 and a communication component 816.

The processing component 802 generally controls the overall operation of the electronic device 800, such as operations related to display, phone call, data communication, camera operation and record operation. The processing component 802 may include one or more processors 820 to execute instructions, to complete all or some steps of the above method. Furthermore, the processing component 802 may include one or more modules for interaction between the processing component 802 and other components. For example, the processing component 802 may include a multimedia module to facilitate interaction between the multimedia component 808 and the processing component 802.

The memory 804 is configured to store various types of data to support operations of the electronic device 800. Examples of the data include instructions for any application or method operated on the electronic device 800, contact data, telephone directory data, messages, pictures, videos, and the like. The memory 804 may be any type of volatile or non-volatile storage devices or a combination thereof, such as Static Random Access Memory (SRAM), Electronic Erasable Programmable Read-Only Memory (EEPROM), Erasable Programmable Read-Only Memory (EPROM), Read-Only Memory (ROM), a magnetic memory, a flash memory, a magnetic disk or a compact disk.

The power supply component 806 supplies electric power to components of the electronic device 800. The power supply component 806 may include a power supply management system, one or more power supplies, and other components related to power generation, management and allocation of the electronic device 800.

The multimedia component 808 includes a screen providing an output interface between the electronic device 800 and a user. In some embodiments, the screen may include a Liquid Crystal Display (LCD) and a Touch Panel (TP). If the screen includes the touch panel, the screen may be embodied as a touch screen to receive an input signal from the user. The touch panel includes one or more touch sensors to sense the touch, sliding, and gestures on the touch panel. The touch sensor may not only sense a boundary of the touch or sliding action, but also detect duration and pressure related to the touch or sliding operation. In some embodiments, the multimedia component 808 includes a front camera and/or a rear camera. When the electronic device 800 is in an operating mode such as a shooting mode or a video mode, the front camera and/or the rear camera may receive external multimedia data. Each front camera and rear camera may be a fixed optical lens system or have a focal length and optical zooming capability.

The audio component 810 is configured to output and/or input an audio signal. For example, the audio component 810 includes a microphone (MIC). When the electronic device 800 is in the operating mode such as a call mode, a record mode and a voice identification mode, the microphone is configured to receive the external audio signal. The received audio signal may be further stored in the memory 804 or sent by the communication component 816. In some embodiments, the audio component 810 also includes a loudspeaker configured to output the audio signal.

The I/O interface 812 provides an interface between the processing component 802 and a peripheral interface module. The peripheral interface module may be a keyboard, a click wheel, a button, or the like. The button may include but is not limited to a home button, a volume button, a start button and a lock button.

The sensor component 814 includes one or more sensors configured to provide state evaluation in various aspects for the electronic device 800. For example, the sensor component 814 may detect an on/off state of the electronic device 800 and relative positions of the components such as a display and a small keyboard of the electronic device 800. The sensor component 814 may also detect the position change of the electronic device 800 or a component of the electronic device 800, presence or absence of a user contact with electronic device 800, orientation or acceleration/deceleration of the electronic device 800 and the temperature change of the electronic device 800. The sensor component 814 may include a proximity sensor configured to detect the presence of nearby objects without any physical contact. The sensor component 814 may further include an optical sensor such as a Complementary Metal Oxide Semiconductor (CMOS) or Charge Coupled Device (CCD) image sensor applied in an imaging application. In some embodiments, the sensor component 814 may further include an acceleration sensor, a gyroscope sensor, a magnetic sensor, a pressure sensor or a temperature sensor.

The communication component 816 is configured to facilitate communication in a wire or wireless manner between the electronic device 800 and other devices. The electronic device 800 may access a wireless network based on a communication standard, such as Wireless Fidelity (Wi-Fi), second generation mobile communication technology (2G), third generation mobile communication technology (3G), fourth generation mobile communication (4G) technology/long-term evolution of universal mobile communication technology (LTE), fifth generation mobile communication technology (5G) or a combination thereof. In an exemplary embodiment, the communication component 816 receives a broadcast signal or broadcast related information from an external broadcast management system via a broadcast channel. In an exemplary embodiment, the communication component 816 further includes a Near Field Communication (NFC) module to promote short range communication. For example, the NFC module may be implemented on the basis of Radio Frequency Identification (RFID) technology, Infrared Data Association (IrDA) technology, Ultra-Wide Band (UWB) technology, Bluetooth (BT) technology and other technologies.

In exemplary embodiments, the electronic device 800 may be implemented by one or more Application Specific Integrated Circuits (ASIC), Digital Signal Processors (DSP), Digital Signal Processing Device (DSPD), Programmable Logic Device (PLD), Field Programmable Gate Array (FPGA), controllers, microcontrollers, microprocessors or other electronic elements to execute the above method.

In an exemplary embodiment, there is further provided a non-volatile computer-readable storage medium, such as a memory 804 including computer program instructions. The computer program instructions may be executed by a processor 820 of an electronic device 800 to implement the above method.

The present disclosure relates to the field of augmented reality. By obtaining the image information of a target object in the real environment, and then detecting or identifying the related features, states and attributes of the target object with the help of various visual correlation algorithms, the AR effect of combining virtual and reality matching with specific applications may be obtained. For example, the target object may relate to faces, limbs, gestures, actions, and the like related to human bodies, or markers and markers related to objects, or sand tables, display areas or display items related to venues or places, and the like. The related algorithms may involve visual positioning, SLAM, 3D reconstruction, image registration, background segmentation, key point extraction and tracking of objects, pose or depth detection of objects, and the like. The application may involve not only interactive scenes such as tutorials, navigation, explanation, reconstruction, and virtual effect overlay display related to real scenes or objects, but also interactive scenes related to people, such as makeup beautification, body beautification, special effect display, and virtual model display. Convolutional neural network may be used for detecting or identifying the relevant features, states and attributes of the target object. The convolutional neural network is the neural model obtained by model training based on a deep learning framework.

Figure 12:
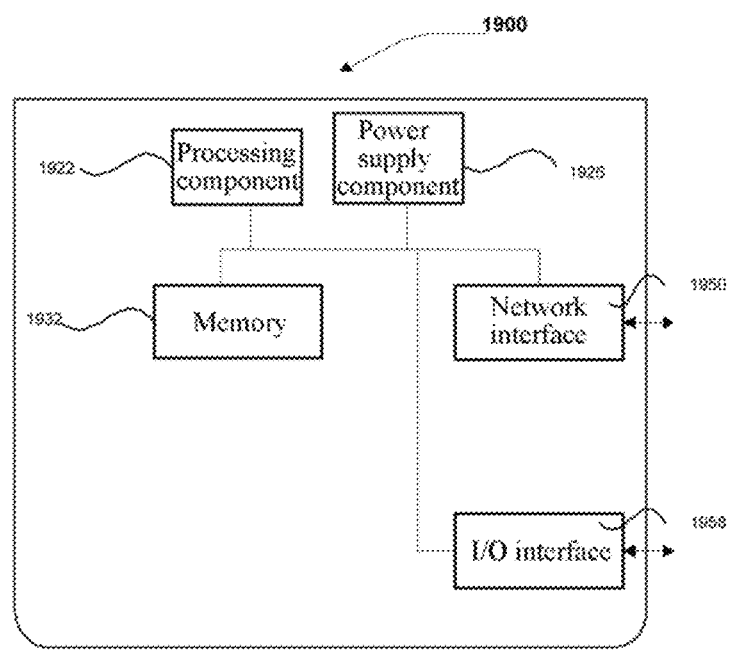
FIG. 12 illustrates a block diagram of an electronic device 1900 according to an embodiment of the present disclosure.

FIG. 12 illustrates a block diagram of an electronic device 1900 according to an embodiment of the present disclosure. For example, the electronic device 1900 may be provided as a server. Referring to FIG. 12, the electronic device 1900 includes a processing component 1922, and further includes one or more processors and memory resources represented by a memory 1932, which are configured to store instructions executed by the processing component 1922, such as an application program. The application program stored in the memory 1932 may include one or more modules each corresponding to a group of instructions. Furthermore, the processing component 1922 is configured to execute the instructions to execute the above method.

The electronic device 1900 may further include a power supply component 1926 configured to perform power supply management on the electronic device 1900, a wire or wireless network interface 1950 configured to connect the electronic device 1900 to a network, and an Input/output (I/O) interface 1958. The electronic device 1900 may run an operating system stored in the memory 1932, such as windows server operating system (Windows Server™), graphical user interface operating system (Mac OS X™) introduced by Apple, a multi-user and multi-process computer operating system (Unix™), Unix-like operating system with free and open source codes (Linux™), open source Unix-like operating system (FreeBSD™) or the like.

In an exemplary embodiment, there is further provided a non-volatile computer-readable storage medium, such as a memory 1932 including computer program instructions. The computer program instructions may be executed by a processing module 1922 of an electronic device 1900 to execute the above method.

The present disclosure may be implemented by a system, a method, and/or a computer program product. The computer program product may include a computer-readable storage medium having computer-readable program instructions for causing a processor to carry out the aspects of the present disclosure stored thereon.

The computer-readable storage medium may be a tangible device that may retain and store instructions used by an instruction executing device. The computer-readable storage medium may be, but not limited to, electronic storage device, magnetic storage device, optical storage device, electromagnetic storage device, semiconductor storage device, or any proper combination thereof. A non-exhaustive list of more specific examples of the computer-readable storage medium includes: portable computer diskette, hard disk, Random Access Memory (RAM), Read-Only Memory (ROM), Erasable Programmable Read-Only Memory (EPROM or Flash memory), Static Random Access Memory (SRAM), portable Compact Disc Read-Only Memory (CD-ROM), Digital Versatile Disk (DVD), memory stick, floppy disk, mechanically encoded device (for example, punchcards or raised structures in a groove having instructions recorded thereon), and any proper combination thereof. A computer-readable storage medium referred herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

Computer-readable program instructions described herein may be downloaded to individual computing/processing devices from a computer-readable storage medium or to an external computer or external storage device via network, for example, the Internet, local region network, wide region network and/or wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium in the respective computing/processing devices.

Computer-readable program instructions for carrying out the operation of the present disclosure may be assembler instructions, Instruction-Set-Architecture (ISA) instructions, machine instructions, machine-related instructions, microcode, firmware instructions, state-setting data, or source code or object code written in any combination of one or more programming languages, including an object oriented programming language, such as Smalltalk, C++ or the like, and the conventional procedural programming languages, such as the "C" programming language or similar programming languages. The computer-readable program instructions may be executed completely on the user computer, partly on the user computer, as a stand-alone software package, partly on the user computer and partly on a remote computer, or completely on a remote computer or a server. In the scenario with remote computer, the remote computer may be connected to the user computer through any type of network, including Local Region Network (LAN) or Wide Region Network (WAN), or connected to an external computer (for example, through the Internet connection from an Internet Service Provider). In some embodiments, electronic circuitry, such as programmable logic circuitry, Field-Programmable Gate Arrays (FPGA), or Programmable Logic Arrays (PLA), may be customized from state information of the computer-readable program instructions; and the electronic circuitry may execute the computer-readable program instructions, to achieve the aspects of the present disclosure.

Aspects of the present disclosure have been described herein with reference to the flowchart and/or the block diagrams of the method, device (system), and computer program product according to the embodiments of the present disclosure. It will be appreciated that each block in the flowchart and/or the block diagram, and combinations of blocks in the flowchart and/or block diagram, may be implemented by the computer-readable program instructions.

These computer-readable program instructions may be provided to a processor of a general purpose computer, a dedicated computer, or other programmable data processing devices, to produce a machine, such that the instructions create means for implementing the functions/acts specified in one or more blocks in the flowchart and/or block diagram when executed by the processor of the computer or other programmable data processing devices. These computer-readable program instructions may also be stored in a computer-readable storage medium, where the instructions cause a computer, a programmable data processing device and/or other devices to function in a particular manner, such that the computer-readable storage medium having instructions stored therein includes a product that includes instructions implementing aspects of the functions/acts specified in one or more blocks in the flowchart and/or block diagram.

The computer-readable program instructions may also be loaded onto a computer, other programmable data processing devices, or other devices to have a series of operational steps performed on the computer, other programmable devices or other devices, to produce a computer implemented process, such that the instructions executed on the computer, other programmable devices or other devices implement the functions/acts specified in one or more blocks in the flowchart and/or block diagram.

The flowcharts and block diagrams in the drawings illustrate the architecture, function, and operation that may be implemented by the system, method and computer program product according to the various embodiments of the present disclosure. In this regard, each block in the flowchart or block diagram may represent a part of a module, a program segment, or a part of code, which includes one or more executable instructions for implementing the specified logical function(s). In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It will also be noted that each block in the block diagram and/or flowchart, and combinations of blocks in the block diagram and/or flowchart, may be implemented by dedicated hardware-based systems performing the specified functions or acts, or by combinations of dedicated hardware and computer instructions.

The computer program product may be implemented specifically by hardware, software or a combination thereof. In an optional embodiment, the computer program product is specifically embodied as a computer storage medium. In another optional embodiment, the computer program product is specifically embodied as a software product, such as Software Development Kit (SDK) and the like.

Although the embodiments of the present disclosure have been described above, it will be appreciated that the above descriptions are merely exemplary, but not exhaustive; and that the disclosed embodiments are not limiting. A number of variations and modifications may occur to those skilled in the art without departing from the scopes and spirits of the described embodiments. The terms in the present disclosure are selected to provide the best explanation on the principles and actual applications of the embodiments or the technical improvements to the arts on market, or to make the embodiments described herein understandable to those skilled in the art.

What is claimed is:

1. A method for web search, applied to a user terminal, the method comprising:
displaying a visual spelling page, wherein the visual spelling page comprises a query keyboard with keys that flicker;
acquiring a steady-state visual evoked potential (SSVEP) from first electroencephalogram (EEG) information obtained from a user when the user gazes at the query keyboard, wherein the SSVEP is generated when the user gazes at a key of the keys on the query keyboard and the first EEG information comprises brain electric activities of the user;
sending the SSVEP to a server to cause the server to, based on the SSVEP, determine a character string inputted by the user and a landing page corresponding to the character string; and
in response to receiving the landing page sent by the server, displaying the landing page.

2. The method according to claim 1, further comprising:
after the landing page is displayed, acquiring second EEG information, wherein the second EEG information is generated when the user gazes at the landing page;
sending the second EEG information to the server to cause the server to detect a feedback information of the user in response to the landing page based on the second EEG information and to determine a search engine result page based on the feedback information, wherein the feedback information comprises emotion information determined based on the second EEG information, and the search engine result page comprises at least two search results corresponding to the character string; and
in response to receiving the search engine result page sent by the server, displaying the search engine result page.

3. The method according to claim 2, further comprising:
acquiring eye movement information of the user,
wherein the sending of the SSVEP to the server to cause the server to determine the character string inputted by the user based on the SSVEP comprises:
sending the SSVEP and the eye movement information to the server to cause the server to determine the character string inputted by the user based on the SSVEP and the eye movement information.

4. The method according to claim 3, further comprising:
based on the eye movement information and/or the second EEG information indicating that the user is paying attention to a preset area in the landing page, displaying a landing keyboard in the landing page, wherein the landing keyboard comprises at least one key position, and each key position corresponds to a different operation; and
determining a selected key position based on the eye movement information and/or the second EEG information, and executing an operation corresponding to the selected key position.

5. The method according to claim 3, further comprising:
based on the eye movement information and/or the second EEG information indicating that the user is paying attention to a preset area in the search engine result page, displaying at least one search engine result keyboard, wherein each search engine result keyboard comprises at least one key position, and each key position corresponds to a different operation; and
determining a selected key position based on the eye movement information and/or the second EEG information, and executing an operation corresponding to the selected key position.

6. The method according to claim 1, wherein the visual spelling page further comprises a query suggestion module, and
wherein the sending of the SSVEP to the server to cause the server to, based on the SSVEP, determine the character string inputted by the user and the landing page corresponding to the character string comprises:

sending the SSVEP to the server to cause the server to, based on the SSVEP, determine the character string inputted by the user and at least one query term corresponding to the character string;
in response to receiving the character string and the at least one query term sent by the server, displaying the character string and the at least one query term through the query suggestion module;
causing the server to acquire a search context in the first EEG information, wherein the search context comprises user state information; and
sending a search context from the user terminal to the server to cause the server to determine the landing page based on the at least one query term and the search context.

7. The method according to claim 1, wherein each of the keys on the query keyboard comprises a function and different functioning keys on the query keyboard flicker at different frequencies.

8. The method according to claim 7, wherein the key that the user gazes at flickers at a first frequency and the SSVEP generated when the user gazes at the key comprises a signal comprising a second frequency that is equal to the first frequency.

9. The method according to claim 1, further comprising:
after the landing page is displayed, acquiring EEG information, wherein the EEG information is generated when the user gazes at the landing page;
sending the EEG information to the server to cause the server to detect a feedback information of the user in response to the landing page based on the EEG information and to determine a search engine result page based on the feedback information, wherein the feedback information comprises emotion information determined based on the EEG information, and the search engine result page comprises at least two search results corresponding to the character string, wherein determining the search engine result page based on the feedback information comprises:
determining a difference between a subject of each of the at least two search results and a subject of the landing page;
in an event that the feedback information is dissatisfaction, ranking a first search result of the at least two search results with a larger difference of the difference higher than a second search result of the at least two search results with a smaller difference of the difference;
in the event that the feedback information is satisfaction, ranking the first search result lower than the second search result; and
in response to receiving the search engine result page sent by the server, displaying the search engine result page.

10. A method for web search, applied to a server, the method comprising:
receiving a steady-state visual evoked potential (SSVEP) sent by a user terminal, wherein the SSVEP is acquired from first electroencephalogram (EEG) information obtained from a user of the user terminal when the user gazes at a query keyboard of the user terminal and the SSVEP is generated when a user gazes at a key among a plurality of keys that flicker on the query keyboard of the user terminal, the first EEG information comprising brain electric activities of the user;
based on the SSVEP, determining a character string inputted by the user and a landing page corresponding to the character string; and sending the landing page to the user terminal to cause the user terminal to display the landing page.

11. The method according to claim 10, further comprising:
receiving second EEG information sent by the user terminal, wherein the second EEG information is generated when the user gazes at the landing page of the user terminal;
detecting a feedback information of the user in response to the landing page based on the second EEG information, wherein the feedback information comprises emotion information determined based on the second EEG information;
determining a search engine result page based on the feedback information, wherein the search engine result page comprises at least two search results corresponding to the character string; and
sending the search engine result page to the user terminal to cause the user terminal to display the search engine result page.

12. The method according to claim 11, wherein the determining of the search engine result page based on the feedback information, comprises:
determining a difference between a subject of each search result and a subject of each of the landing page; and
based on the feedback information being dissatisfaction, ranking a search result with a larger difference higher than a search result with a smaller difference in the search engine result page,
or based on the feedback information being satisfaction, ranking a search result with a larger difference lower than a search result with a smaller difference in the search engine result page.

13. The method according to claim 11, further comprising:
receiving eye movement information of the user sent by the user terminal, and
the determining of the character string inputted by the user based on SSVEP comprises determining the character string inputted by the user based on the SSVEP and the eye movement information.

14. The method according to claim 13, wherein the detecting of the user's feedback information in response to the landing page based on the second EEG information comprises:
inputting the second EEG information to a satisfaction predicting module to determine a degree of satisfaction of the user;
determining a corresponding relationship between the degree of satisfaction and each text content in the landing page based on the eye movement information and/or the second EEG information; and
determining the feedback information based on the degree of satisfaction corresponding to each text content in the landing page.

15. The method according to claim 10, wherein the determining of the character string inputted by the user and the landing page corresponding to the character string based on the SSVEP comprises:
based on the SSVEP, determining the character string inputted by the user and at least one query term corresponding to the character string;
sending the character string and the at least one query term corresponding to the character string to the user terminal to cause the user terminal to display the character string and the at least one query term in a query suggestion module of a visual spelling page;

receiving a search context sent by the user terminal, wherein the search context comprises user state information; and determining the landing page based on the at least one query term and the search context.

16. The method according to claim 15, wherein the the determining of the character string inputted by the user and at least one query term corresponding to the character string based on the SSVEP comprises:

determining the character string inputted by the user based on the SSVEP; and determining at least one query term corresponding to the character string by means of a candidate word generation algorithm with massive information on Internet.

17. The method according to claim 10, further comprising:

receiving second EEG information sent by the user terminal in real time, wherein the second EEG information is generated when the user browses a search engine result page displayed by the user terminal;

detecting a preference information of the user about search results in the search engine result page in real time based on the second EEG information;

re-ranking respective search results in the search engine result page in real time based on the preference information to obtain a re-ranked search engine result page; and sending the re-ranked search engine result page to the user terminal to cause the user terminal to display the re-ranked search engine result page in real time.

18. An electronic device, comprising:

a processor; and a memory configured to store processor-executable instructions, wherein the processor is configured to call the processor-executable instructions stored in the memory to execute a method for web search, applied to a user terminal, the method comprising:

displaying a visual spelling page, wherein the visual spelling page comprises a query keyboard with keys that flicker;

acquiring a steady-state visual evoked potential (SSVEP) from first electroencephalogram (EEG) information obtained from a user when the user gazes at the query keyboard, wherein the SSVEP is generated when the user gazes at a key of the keys on the query keyboard and the first EEG information comprises brain electric activities of the user;

sending the SSVEP to a server to cause the server to, based on the SSVEP, determine a character string inputted by the user and a landing page corresponding to the character string; and in response to receiving the landing page sent by the server, displaying the landing page.

19. A computer-readable storage medium having computer program instructions stored thereon, wherein the computer program instructions, when executed by a processor, implement a method for web search, applied to a user terminal, the method comprising:

displaying a visual spelling page, wherein the visual spelling page comprises a query keyboard with keys that flicker;

acquiring a steady-state visual evoked potential (SSVEP) from first electroencephalogram (EEG) information obtained from a user when the user gazes at the query keyboard, wherein the SSVEP is generated when the user gazes at a key of the keys on the query keyboard and the first EEG information comprises brain electric activities of the user;

sending the SSVEP to a server to cause the server to, based on the SSVEP, determine a character string inputted by the user and a landing page corresponding to the character string; and in response to receiving the landing page sent by the server, displaying the landing page.

* * * * *